US012789237B2

(12) United States Patent
Meneses

(10) Patent No.: US 12,789,237 B2
(45) Date of Patent: Nov. 10, 2026

(54) MODULAR UNDERWATER VEHICLE WITH MODULES THAT CAN BE ORIENTED RELATIVE TO EACH OTHER

(71) Applicant: Arturo Benjamin Meneses, Lingen (DE)

(72) Inventor: Arturo Benjamin Meneses, Lingen (DE)

( * ) Notice: Subject to any disclaimer, the term of this patent is extended or adjusted under 35 U.S.C. 154(b) by 742 days.

(21) Appl. No.: 17/904,904

(22) PCT Filed: Feb. 26, 2021

(86) PCT No.: PCT/EP2021/054943
§ 371 (c)(1),
(2) Date: Aug. 24, 2022

(87) PCT Pub. No.: WO2021/170855
PCT Pub. Date: Sep. 2, 2021

(65) Prior Publication Data

US 2023/0113290 A1 Apr. 13, 2023

(30) Foreign Application Priority Data

Feb. 28, 2020 (DE) ........................ 102020105384.3

(51) Int. Cl.

| | |
|---|---|
| ***B08B 1/12*** | (2024.01) |
| ***B08B 1/16*** | (2024.01) |
| ***B08B 1/30*** | (2024.01) |
| ***B63B 81/00*** | (2020.01) |
| ***B63G 8/00*** | (2006.01) |

(52) U.S. Cl.
CPC ................ *B08B 1/12* (2024.01); *B08B 1/165* (2024.01); *B08B 1/30* (2024.01); *B63B 81/00* (2020.01); *B63G 8/001* (2013.01); *B63G 2008/007* (2013.01)

(58) Field of Classification Search
CPC .... B63G 8/00; B63G 8/001; B63G 2008/007; B63B 81/00; B08B 1/00; B08B 1/30; B08B 1/12; B08B 1/165; B25J 9/065
USPC ........................................................ 114/313
See application file for complete search history.

(56) References Cited

U.S. PATENT DOCUMENTS

| | | | |
|---|---|---|---|
| 5,040,923 A | 8/1991 | Do | |
| 10,751,872 B2 * | 8/2020 | Pettersen | ................ B25J 9/065 |
| 2018/0021945 A1 | 1/2018 | Pettersen et al. | |

FOREIGN PATENT DOCUMENTS

| | | |
|---|---|---|
| CN | 203293193 U | 11/2013 |
| DE | 102015121769 A1 | 6/2017 |

* cited by examiner

*Primary Examiner* — Lars A Olson
(74) *Attorney, Agent, or Firm* — Ice Miller LLP; Justin Swindells

(57) ABSTRACT

An underwater vehicle is provided for cleaning, inspection and/or monitoring of underwater structures A. The vehicle includes at least one working equipment for cleaning, inspection and/or monitoring of underwater structures A. Several interconnected modules are also provided which can be oriented relative to each other. The modules are arranged one behind the other, and the underwater vehicle can be transitioned from an elongated movement configuration into a U-shaped, C-shaped, spiral and/or an annular working configuration and back.

27 Claims, 19 Drawing Sheets

MODULAR UNDERWATER VEHICLE WITH MODULES THAT CAN BE ORIENTED RELATIVE TO EACH OTHER

CROSS REFERENCE

This application claims priority to PCT Application No. PCT/EP2021/054943, filed Feb. 26, 2021, which itself claims priority to German Patent Application No. 10 2020 105 384.3, filed Feb. 28, 2020, the entireties of both of which are hereby incorporated by reference.

FIELD OF THE INVENTION

The invention concerns an underwater vehicle for cleaning, inspection and/or monitoring of underwater structures. Such underwater vehicles are unmanned and are used as a remotely operated vehicle (ROV) or as an autonomous underwater vehicle (AUV).

BACKGROUND OF THE INVENTION

Such an underwater vehicle is shown, for example, in DE WO 2016/055408 A1. It has several interconnected modules which can be oriented relative to each other. The modules which can be oriented relative to each other are used to move the underwater vehicle forward under water.

US 2018/0021945 A1 shows an underwater vehicle for the inspection, maintenance and repair of underwater structures with several interconnected modules which can be oriented relative to each other. The underwater vehicle has a propeller and thrust nozzle modules. The underwater vehicle forms an autonomous robotic arm.

BRIEF SUMMARY OF THE INVENTION

The object of the present invention is to develop an underwater vehicle in such a way that it can better carry out the tasks of cleaning, inspection and/or monitoring.

According to the invention, this object is achieved in that the underwater vehicle has a plurality of modules that can be relative to each other, which are arranged one behind the other, wherein the underwater vehicle can be transitioned from an elongated movement configuration into a u-shaped, c-shaped, spiral and/or annular working configuration and back. For this purpose, the modules are movably connected in particular by connecting elements such as linkage arrangements, couplings or elastomer elements, wherein in each case at least one connecting element is arranged between two modules. In particular, the water vehicle has configuration sensors by means of which the orientation of the modules can be detected. The orientation of the modules relative to each other is carried out in particular by motors which act via the respective connecting elements and thus orient adjacent modules relative to each other, and/or by propulsion elements arranged on or in the respective modules, by which the position and/or direction of movement of the modules in the water and thus also the orientation of the individual modules relative to each other can be influenced. Furthermore, the underwater vehicle has a control unit in which, in particular, data from the configuration sensors can be acquired and evaluated and which is set up to cause the transition of the water vehicle into different configurations, in particular in that the control unit transmits suitable control signals to the motors and/or pro-pulsion elements. These control commands may be determined in particular depending on at least one position sensor by which the position of the underwater vehicle can be determined relative to the underwater structure to be cleaned, inspected and/or monitored, or absolutely relative to the environment.

Such an underwater vehicle is very maneuverable in the elongated movement configuration and is able to pass through comparatively small passages to reach the underwater structure to be examined. In a u-shaped, c-shaped, spiral and/or annular working configuration, the underwater vehicle may partly or completely surround the underwater structure to be examined. Preferably, cleaning, inspection and/or monitoring of the underwater structure is carried out in this working configuration. Due to the fact that the underwater vehicle partially or completely surrounds the underwater structure to be examined, the underwater vehicle is less susceptible to positional changes, in particular due to water currents. The underwater vehicle can be positioned more precisely on the underwater structure to be examined and held in its position or changing positions on the underwater structure during cleaning, inspection and/or monitoring. This facilitates the targeted cleaning, inspection and/or monitoring of in particular certain sections of the underwater structure.

Preferably, the underwater vehicle has at least one coupling device by means of which the underwater vehicle can be fixed to an object to be inspected and/or can be connected to itself in the annular working configuration. This ensures that the underwater vehicle can be particularly easily fixed to the object to be inspected, the underwater structure, and oriented relative to it. However, the underwater vehicle can also be transitioned to the annular working configuration without surrounding an underwater structure. In the annular working configuration, the underwater vehicle has a more flexible movement control system compared to the elongated movement configuration, especially due to the more compact extent. The underwater vehicle can thus be positioned more precisely or can simply maintain a certain position, especially away from an underwater structure in order to monitor it. Especially in the case of underwater vehicles which have 6 or more propulsion elements acting in the radial direction over the 360° circumference, in particular evenly distributed, there are correspondingly many directions in which the propulsion elements can be con-trolled for precise alignment.

Particularly advantageous is the use of a c-shaped, spiral or annular working config-uration for the investigation of underwater structures which have a comparatively constant cross-section along their longitudinal extent. This applies in particular to tubular structures, such as cables and pipelines, provided that they have no branches or other additions/instrumentations in the section to be examined. But vertical structures such as pillars of bridges, oil rigs, production platforms or offshore wind turbines can also be examined particularly easily with such an underwater vehicle in the C-shaped, spiral or annular working configuration. In particular, the underwater vehicle in the C-shaped, spiral or annular working configuration is fixed on the underwater structure in two spatial directions but is movable in the direction of the longitudinal extent of the underwater structure and in the circumferential direction of the underwater structure. Such an underwater vehicle can thus easily examine the underwater structure in the circumferential direction and/or in the direction of its longitudinal extent since the underwater vehicle is freely movable in these two directions. Nevertheless, the C-shaped, spiral or annular working configuration ensures that the underwater vehicle cannot be moved away from the underwater structure to be examined by currents. In particular, flexible pipelines which, for example, connect a floating production and storage unit (Floating Production Storage and Offloading Unit; FPSO) to underwater oil wells, can be easily investigated. The underwater vehicle can drive along an entire flexible pipeline, in sections or in one pass, from the FPSO to an oil well for example, and can clean, inspect and/or monitor it. Particularly preferably, the underwater vehicle can also carry out repair and maintenance work with the help of suitable repair equipment. This effect can be achieved particularly easily in an annular working configuration when the underwater vehicle forms a ring closed by the coupling device.

Particularly preferably, the coupling device has at least one magnet, preferably an electromagnet. This makes it particularly easy to connect the underwater vehicle to objects made of ferromagnetic material to be inspected and/or to itself in the annular working configuration. When using a coupling device with an electromagnet, it is also possible to release the underwater vehicle by actuating the electromagnet in a simple way.

Preferably, at least two modules, particularly preferably all modules, of the underwater vehicle are provided with working equipment for cleaning, inspection and/or monitoring of an underwater structure. During the cleaning, inspection and/or monitoring of an underwater structure, the modules which can be oriented relative to each other can be oriented relative to each other and to the underwater structure in such a way that a larger area of the underwater structure can be cleaned, inspected and/or monitored at the same time. The working equipment is particularly preferably in the form of an inspection device, more preferably in particular as ultrasonic sensors, magnetic flux leakage (MFL) sensors and/or eddy current sensors. Such inspection devices can be used to examine the underwater structures to be examined for damage such as cracks, corrosion, dents, bulges and similar defects.

Preferably, the working equipment is arranged laterally on the modules. The mod-ules can accordingly be oriented for inspection with their side towards the underwater structure to be examined. This increases the area of examination which can be detected simultaneously by the underwater vehicle according to the invention. In particular, in a u-shaped, c-shaped, spiral and/or annular working configuration, working equipment arranged laterally on the modules can be particularly easily oriented to the underwater structure to be examined and/or brought into contact with the under-water structure.

Particularly preferably, the module has different working equipment on at least two sides. Thus, two different cleaning, inspection and/or monitoring operations can be carried out by an underwater vehicle. For example, the modules may have sensors on one side that are particularly well suited for detecting cracks and on another side, directed away from the first side, sensors that are particularly well suited for detecting corrosion damage. Thus, with the underwater vehicle according to the invention, various possible types of damage can be detected in a dive on the underwater structure to be examined. Such an underwater vehicle can therefore be used particularly efficiently.

More particularly preferably, the modules of the underwater vehicle have cleaning equipment as working equipment on one side, in particular brushes and/scrapers. The underwater vehicle can thus clean the underwater structure to be examined with the cleaning equipment arranged on one side of the modules and, for example, free it from deposits, fouling due to plants and/or animals and any rust layers, before an examination with the inspection device is then carried out. This eliminates the need for another underwater vehicle to prepare for inspection and/or monitoring, which makes it possible to use such an underwater vehicle particularly efficiently. Cleaning and inspection equipment may be arranged on different sides or the same side of the underwater vehicle.

With advantage, the modules on which working equipment is arranged on the side have a cross-section transverse to a longitudinal extent direction of the modules, which has at least one straight section. Particularly preferably, the modules have a cross-section with two straight sections, which are arranged in particular opposite each other. More preferably, the cross-section is rectangular. The working equipment is preferably arranged laterally on the modules in the area of the straight sections. Especially in an annular working configuration of the underwater vehicle, the modules with the straight sections can be oriented towards a tubular underwater structure. The working equipment arranged in the straight sections of the modules can thus be extensively oriented towards the underwater structure. In this way, it can be achieved in a simple way that working equipment in the form of inspection equipment can cover a large area of the underwater structure and/or working equipment in the form of cleaning equipment can clean a large area of the underwater structure.

Preferably, the underwater vehicle can be transitioned into at least two different working configurations, wherein in each of the working configurations a different side of the module is oriented towards a space surrounded by the working configuration.

For this purpose, the modules can be swiveled in different directions around a vertical axis between the modules due to the links formed between or through the modules. Thus, in each of the at least two different working configurations, different working equipment arranged on the modules is directed towards the underwater structure. The underwater structure can thus be cleaned, inspected and/or monitored by the same underwater vehicle. Alternatively or additionally, different cleaning, inspection and/or monitoring steps can be carried out with different working equipment, but also with the same underwater vehicle. Such an underwater vehicle can be used particularly economically.

Particularly preferably, the underwater vehicle is designed to take up at least two different annular or approximately annular working configurations, in particular in which the underwater vehicle is connected to itself to form a closed or almost closed ring, wherein in each of the different annular working configurations, different working equipment is oriented towards the inside of the ring or an underwater structure surrounded by the underwater vehicle in the annular working configuration.

Preferably, the underwater vehicle is set up to carry out repair and/or maintenance work on an underwater structure, particularly preferably on a pipeline. This work may be carried out directly during or immediately following a cleaning, inspection and/or monitoring operation. For this purpose, the underwater vehicle may have appropriate working equipment. Particularly preferably, however, at least one module has at least one corresponding repair device, such as a welding apparatus, an applicator for a sealant and/or a gripper or manipulator. In particular, the repair equipment is movably fixed to the corresponding module of the underwater vehicle by a remote-control or autonomously acting robot arm.

Preferably, the distance between two modules in the underwater vehicle can be changed. This allows the area that is covered by the working equipment of the at least two modules to be changed. Such an underwater vehicle can be used more flexibly. However, a variable distance between two modules in the annular working configuration is particularly advantageous is. Here, the underwater vehicle in the annular working configuration can be adapted to the underwater structure to be examined. The distance between two modules can be varied, for example, by means of a cam gear or another adjustment device.

Preferably, at least the modules having working equipment are concave in the area in which the working equipment is arranged. Such an implementation is particularly advantageous in the cleaning, inspection and/or monitoring of underwater structures having cylindrical sections. In particular, if such underwater structures are to be cleaned, inspected and/or monitored in a U-shaped, c-shaped, spiral-shaped and/or annular working configuration, the concave modules in the area of the working equipment can achieve improved coverage of the area to be cleaned, inspected and/or monitored with the working equipment arranged on the module.

Preferably, the underwater vehicle has at least two, preferably at least three propulsion elements, which are arranged in, on and/or between the modules, wherein at least two, preferably at least three of these propulsion elements are effective in different spatial directions. A single module preferably has between zero and two propulsion elements effective in different spatial directions, wherein a propulsion element arranged between the module and an adjacent module is not counted. By such limiting of the number of propulsion elements effective in one direction per module, the scarce space in a module can be used more easily and better. Such an underwater vehicle can be maneuvered particularly easily. For example, one propulsion element can cause propulsion in the direction of the longitudinal extent of the under-water vehicle in the movement configuration and another propulsion element can cause propulsion in a direction of movement transverse to the longitudinal extent of the underwater vehicle in the movement configuration. If there are several propulsion elements pointing in different spatial directions, the underwater vehicle can be positioned particularly easily.

Particularly preferably, the propulsion elements are arranged in such a way that they are effective in one of three orthogonal spatial directions when the underwater vehicle is fully extended. Particularly preferably, one of these spatial directions is directed in the direction of the longitudinal extent of the fully extended underwater vehicle, wherein the other two spatial directions are aligned accordingly transverse to this fully extended longitudinal direction of the underwater vehicle and are arranged perpendicular to each other. Such an underwater vehicle ensures that it can be moved in all directions. It is therefore particularly easy to maneuver.

More preferably, the propulsion elements can be individually controlled and/or oriented. Due to the fact that the propulsion elements can be controlled individually, the underwater vehicle can be maneuvered particularly flexibly. The maneuverability is thus increased. Orientation of the propulsion elements in certain spatial directions also helps to increase the maneuverability of the underwater vehicle. An underwater vehicle with high maneuverability can be guided in a particularly simple way to the underwater structure to be examined and also guided past it. In particular, a propulsion element has a propeller or an impeller.

Preferably, spacers are arranged on at least two modules. These spacers will ensure that the distance from a module and/or the underwater vehicle from the underwater structure to be examined does not fall below a certain distance. In particular, this prevents the working equipment from colliding with the underwater structure to be examined and the working equipment and/or the underwater structure from being damaged. When using a c-shaped, spiral and/or annular working configuration, the underwater vehicle can be centered by the spacers around the underwater structure to be examined. This determines the distance of the underwater vehicle from the underwater structure to be examined. Due to a fixed, in particular unchangeable and/or predetermined distance of the working equipment from the underwater structure to be examined, the work result is achieved particularly reliably.

Particularly preferably, the spacers are movable, in particular foldable. The spacers are preferably folded during the movement of the underwater vehicle in the movement configuration, whereby the external dimensions of the underwater vehicle are reduced and the underwater vehicle is particularly easy to maneuver under water and can also pass through narrow passages. In addition, movable spacers may be able to absorb energy in the event of a collision of the underwater vehicle with an underwater structure to be examined. The risk of damage is further reduced. Also, in a c-shaped, spiral and/or annular working configuration, the centering of the underwater vehicle can be improved by movable spacers. In particular, depending on the inspection and/or cleaning equipment, the distance can be adjusted appropriately for the respective working equipment.

Preferably, the underwater vehicle has at least one camera. Such a camera can be used to capture the environment of the underwater vehicle. This camera can thus be used for maneuvering, for optical investigation of the underwater structure to be examined or for the transition of the underwater vehicle from the movement configuration to an in particular annular working configuration. A suitable light source can be assigned to the camera. Depending on the camera used, an infrared light source or a lamp in the normal spectrum visible to the human eye can be used. The underwater vehicle can also have several cameras, for example on different modules.

Particularly preferably, the camera can be moved and/or oriented by means of an adjusting device. This makes it possible, without having to move the entire underwater vehicle, for particular sections, for example of an underwater structure, to be examined. Advantageously, the camera can be transferred by the adjusting device to a position spaced apart from the module on which it is fixed. In this position, for example, optimum monitoring of the inspection process carried out by the underwater vehicle is possible, since the camera spaced apart from the module can simultaneously capture both the module of the underwater vehicle and the underwater structure to be examined. It is also possible to look around the module with such a camera, which can be transferred to a position spaced apart from the module on which it is fixed. Thus, a very large area around the module can be looked over with just one camera.

Preferably, at least one module of the underwater vehicle is buoyant. With a suitable design, it can thus be achieved that such an underwater vehicle can be easily recovered, since it is driven back to the water surface by the buoyant module.

Preferably, at least one module has a ballast tank. Such a ballast tank contains a gaseous medium which is compressed or relaxed by the insertion or discharge of water surrounding the underwater vehicle. Thus, the buoyancy of the underwater vehicle can be regulated and the diving depth of the underwater vehicle can be adjusted. Particularly preferably, several modules, preferably all modules, have a corresponding ballast tank. In such a design, not only the diving depth of the underwater vehicle but also the orientation of the underwater vehicle in the water can be influenced. Such an underwater vehicle may be oriented, for example, horizontally or vertically in an annular working configuration. In a horizontal orientation, such an underwater vehicle is suitable for the investigation of vertical, columnar structures, such as support pillars of wind turbines, whereas in a vertical orientation it is suitable for the investigation of horizontally extending structures, such as pipelines.

Preferably, the underwater vehicle is connected via a supply cable directly or indirectly to a land-based, airborne and/or sea-based control unit. The underwater vehicle can be supplied with energy via such a supply cable. Information such as sensor data or camera images can be transmitted from the underwater vehicle to a control unit. If appropriate, the underwater vehicle can be remotely controlled by a human operator via the control unit. Such an underwater vehicle is indirectly connected to a control unit, for example, if the underwater vehicle has been brought to the application site or to the vicinity of the underwater structure to be examined by means of a launch and recovery system. The underwater vehicle is thus initially directly connected to the launch and recovery system, which in turn is then directly or indirectly connected to a land-based, airborne and/or sea-based control unit.

Alternatively or additionally, the underwater vehicle has at least one device for optical data transmission. In particular, optical data transmission is based on Li-Fi or optical Wi-Fi technology. A device for optical data transmission enables wireless communication under water in a simple and reliable way.

Preferably, the control unit is set up to control the underwater vehicle autonomously or partially autonomously. In particular, the control unit can move autonomously into a specific sea area and/or ca perform predetermined tasks in an unknown environment.

Preferably, the underwater vehicle has at least one navigation unit, in particular a compass, a sonar system and/or a depth gauge. The navigation unit has a data transmission connection to the control unit. As a result, collisions with any obstacles can be avoided—autonomously or user-controlled—and a specific sea area can be selected and/or the route to a specific sea area can be replanned in response to any obstacles.

Preferably, such an underwater vehicle has 4 to 20, particularly preferably 6 to 12 individual modules, in particular with a length of the individual modules of 0.5 m to 5 m.

The object is also achieved by an underwater vehicle system with an underwater vehicle according to the invention. The underwater vehicle system includes a carrier vehicle by which the underwater vehicle can be transported to an application site.

The carrier vehicle and/or the underwater vehicle has at least one means of fixing the underwater vehicle on the carrier vehicle. Preferably, the vehicle has a tether management system (TMS) and the underwater vehicle is connected to the carrier vehicle by a connecting cable (tether).

Preferably, the carrier vehicle has a control unit which is set up to realize an autonomous, or at least partially autonomous operation of the carrier vehicle. In particular, the vehicle can thus independently enter an area of operation and/or react automatically to any replanned situations such as the appearance of a moving obstacle on the way to an area of operation. Particularly preferably, the carrier vehicle has means for satellite-based positioning, in particular GPS, Beidou, Galileo and/or Glonass, and/or means for satellite-based communication. The carrier vehicle is set up to move under water, especially in water depths between 5 and 20 meters, in particular about 10 meters. In these water depths, the carrier vehicle is hardly influenced by near-surface waves. The carrier vehicle can move under water with comparatively small deviations in course. Since at these water depths the watercraft cannot or cannot reliably receive signals for satellite-based positioning and/or signals for satellite-based communication, it is set up via the control unit to move towards the water surface at certain intervals, in particular to the water surface, in order to carry out a position determination and/or to establish a communication link.

Preferably, the carrier vehicle has several interconnected modules which can be oriented relative to each other. For this purpose, linkages are arranged between the individual modules or the modules form such linkages between themselves. In particular, a propulsion element is arranged on at least one module, by means of which the carrier vehicle can be moved. A propulsion element such as a propeller or impeller enables energy-efficient movement of the carrier vehicle. Particularly preferably, the module has at least two propulsion elements which are or can be oriented in different spatial directions. A carrier vehicle designed in this way has improved maneuverability. In particular, a carrier vehicle with a plurality of propulsion elements which are or can be oriented in different spatial directions can be kept particularly well at a certain point or within a certain area in the water.

Preferably, the carrier vehicle has one or more energy storage devices, in particular accumulators. The underwater vehicle can be transported to the application area without using the energy from any onboard energy storage. The operating radius of the underwater vehicle is thus increased without space being made available in the underwater vehicle for (additional) energy storage. The advantages resulting from the high mobility and the slim design of the underwater vehicle in use are thus retained. In particular, the carrier vehicle is set up to supply the underwater vehicle with energy from its energy supply. The carrier vehicle and the underwater vehicle are preferably provided with appropriate charging equipment, in particular inductive charging equipment.

Preferably, the carrier vehicle can be transitioned from an elongated movement configuration to an annular deployment configuration. In particular, the carrier vehicle has a connecting device by which the carrier vehicle can be connected to itself in the annular deployment configuration. The carrier vehicle can be moved particularly efficiently in the direction of the longitudinal axis in the elongated movement configuration. In an annular deployment configuration, the carrier vehicle can be moved to and held particularly well in a certain position. Alternatively, the carrier vehicle can be placed around a structure in the water such as a buoy or a support. The carrier vehicle can thus remain at or near the application site when using the underwater vehicle, in particular at or near the water surface. Particularly preferably, the carrier vehicle has a transmitting and receiving unit, in particular for satellite communication.

This allows the carrier vehicle to be brought into a communication link with a control unit. The carrier vehicle forms a connecting station in the underwater vehicle system. In particular, the carrier vehicle has equipment for light-based communication such as Li-Fi or optical Wi-Fi. This can be used to establish a connection with the appropriately equipped underwater vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

FIGS. 17*a* through 17*e* show schematically a carrier vehicle of an underwater vehicle system.

FIGS. 18*a* through 18*b* show schematically an underwater vehicle system with a carrier vehicle according to FIG. 17 and an underwater vehicle according to FIG. 1.

DETAILED DESCRIPTION OF THE INVENTION

Figure 1:
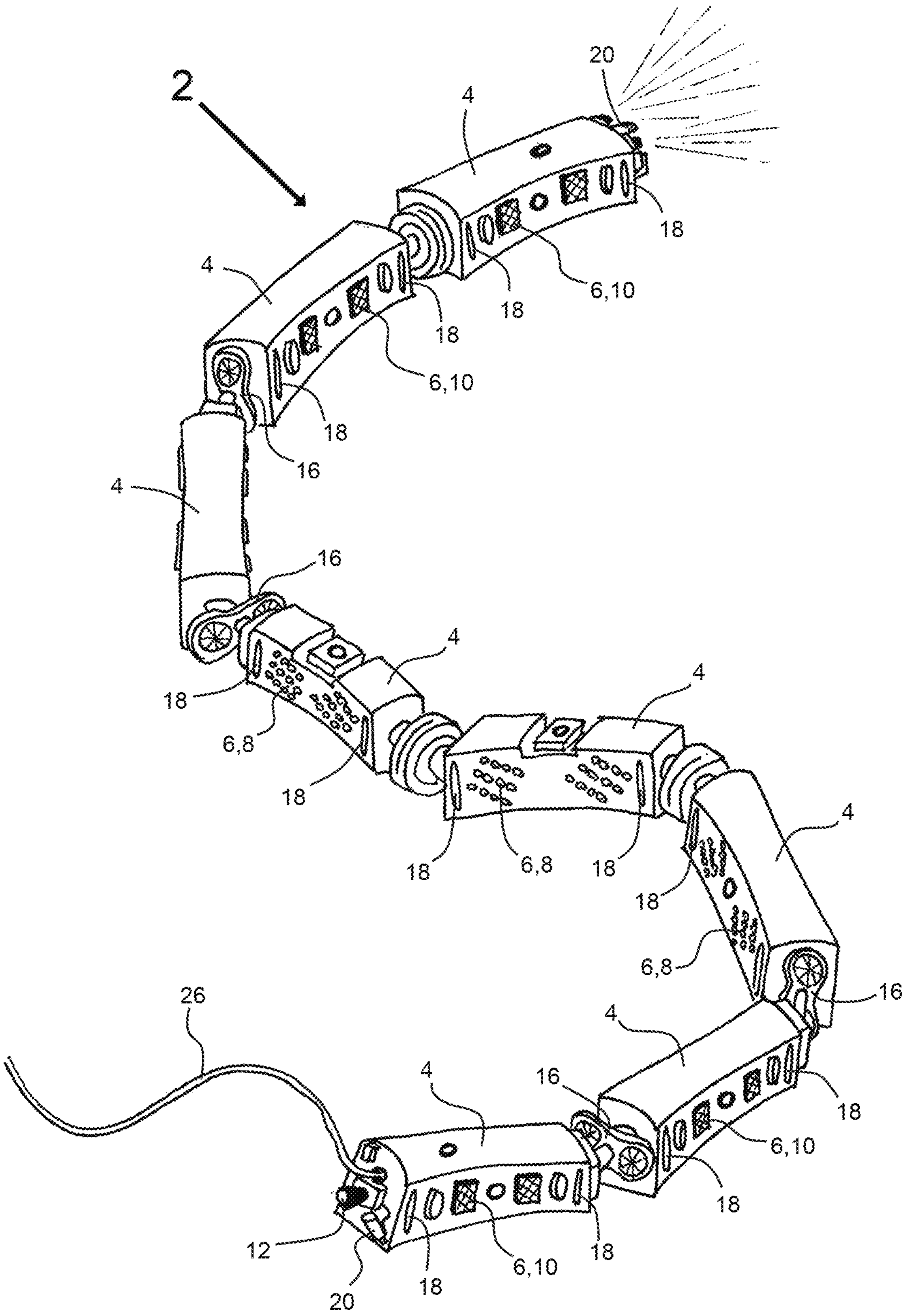
FIG. 1 shows schematically an underwater vehicle according to an example embodiment of the invention.

Parts acting the same or similarly are provided with identical reference characters, provided that this is useful. Individual technical features of the examples described below can be combined with the features of individual exemplary embodiments described above to form objects according to the invention.

FIG. 1 shows an underwater vehicle 2 with eight modules 4. An underwater vehicle 2 according to the invention may also have more or fewer modules 4. The modules 4 of the underwater vehicle 2 according to FIG. 1 can each be oriented relative to each other. The modules 4 have working equipment 6 arranged on opposite sides of each module, wherein different working equipment 6 is arranged on the two sides of mod-ules 4 facing away from each other. On the one side, the working equipment 6 is designed as inspection equipment 8. On the other side, the working equipment 6 is implemented as cleaning equipment 10. The working equipment 6 can also be arranged on other sides of the modules 4. Likewise, further working equipment 6 can be arranged on the modules 4.

The underwater vehicle 2 has coupling devices 12 which are arranged in the present case on the first (not shown) and last module 4 of the underwater vehicle 2. The last module 4 of the underwater vehicle 2 is the module at which the supply cable 26 ends. The underwater vehicle according to the embodiment is thus an ROV. An underwater vehicle according to the invention may also be in the form of an AUV.

The underwater vehicle 2 also has cameras 20. Propulsion elements 16 are aranged between the modules and in the modules (not shown). Furthermore, the modules 4 each have 6 spacers 18 arranged next to the working equipment. The underwater vehicle 2 can also have other cameras 20, for example on other modules 4.

Figure 2:
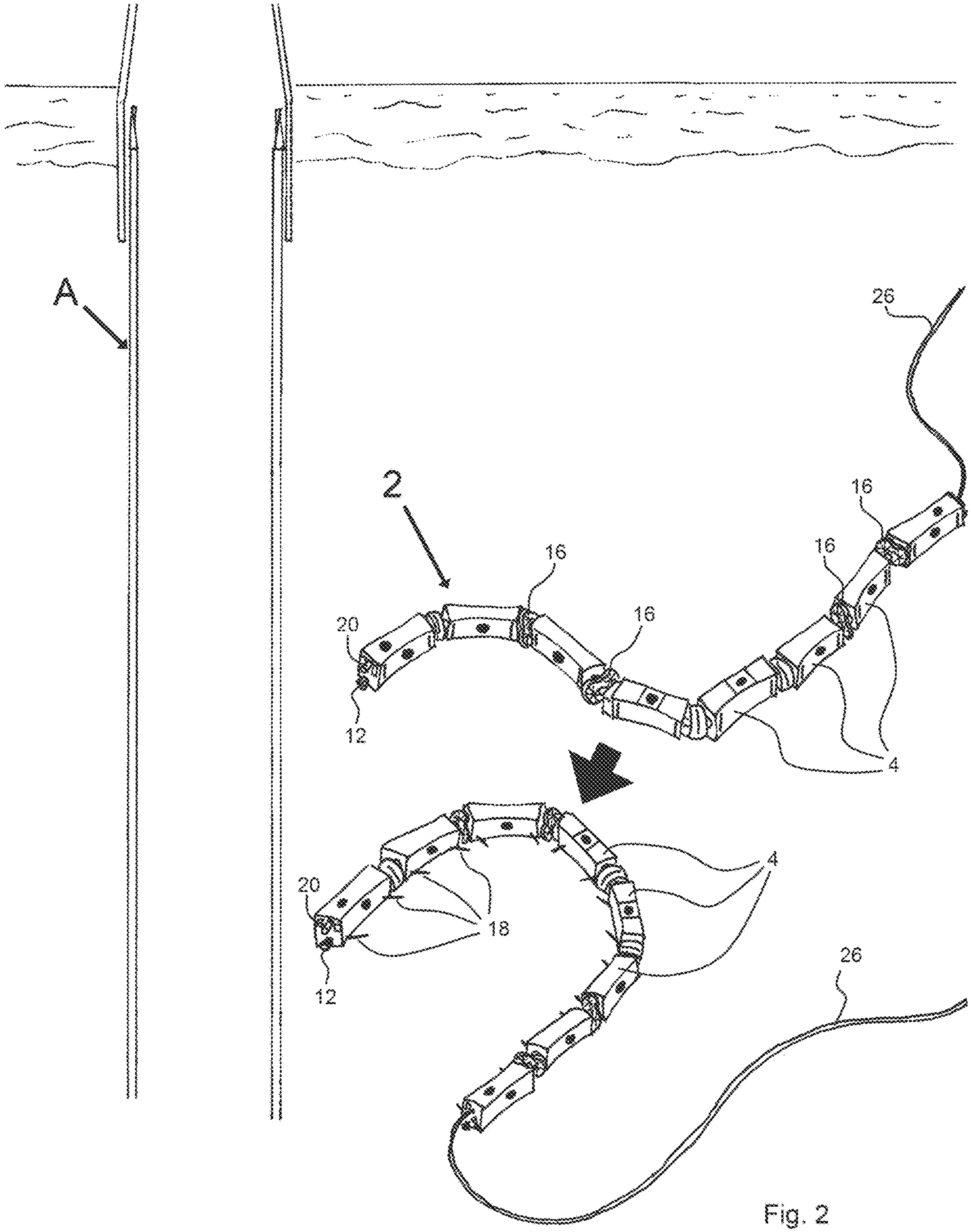
FIG. 2 shows schematically the underwater vehicle according to FIG. 1 in a movement configuration and in a working configuration.

FIG. 2 shows an underwater vehicle 2, which is moved in an elongated movement configuration towards an underwater structure A. The vehicle 2 is then transitioned to a U-shaped working configuration. The orientation of the modules relative to each other can be carried out either by appropriate orientation devices of the modules themselves or by appropriate actuation of the propulsion elements 16. In the working configuration of the underwater vehicle 2, the spacers 18 are shown unfolded. These serve to prevent or cushion a collision of the underwater vehicle 2 with the underwater structure A in order to avoid damage to the underwater vehicle 2, in particular the working equipment 6.

Figure 3:
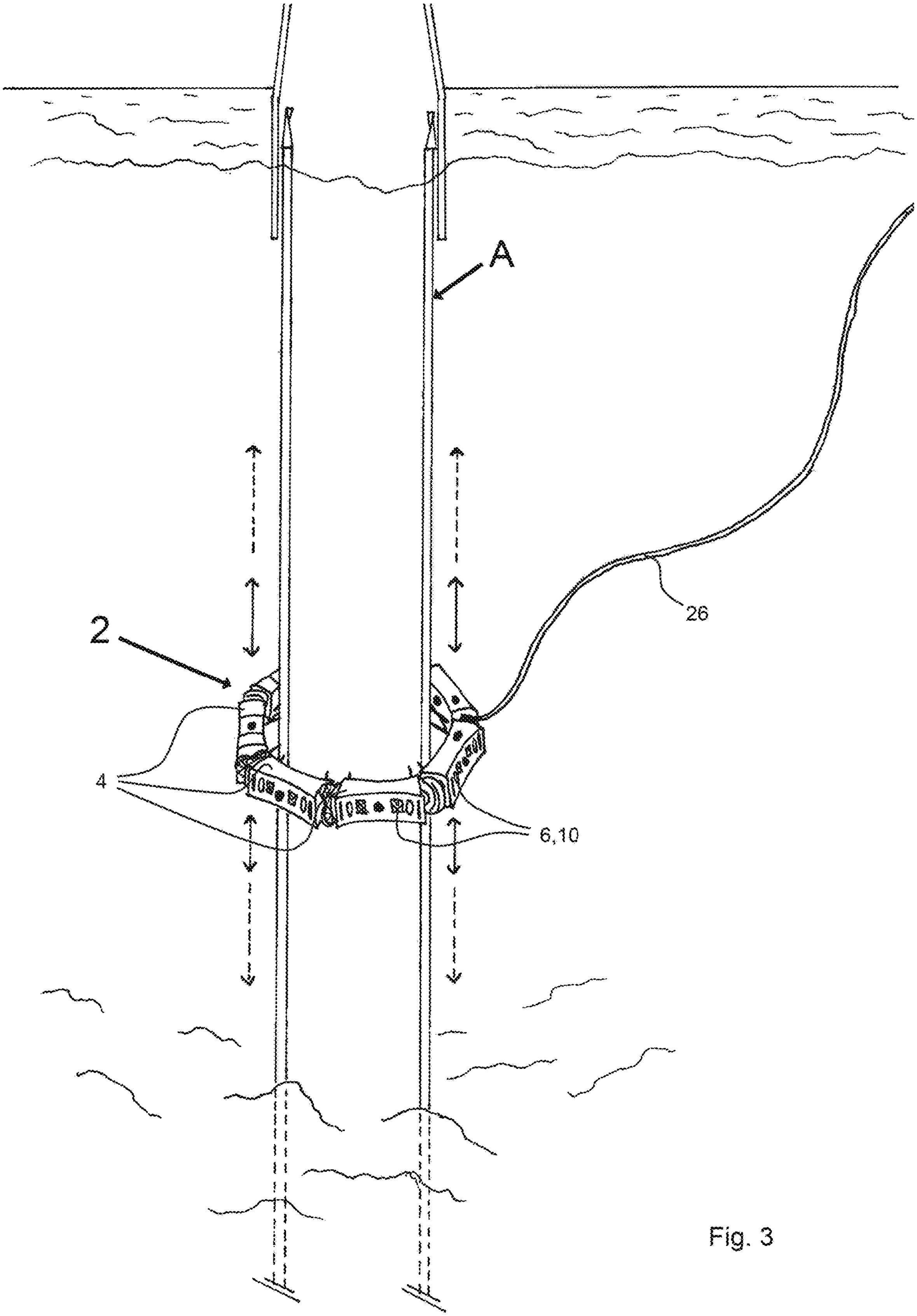
FIG. 3 shows schematically the underwater vehicle from FIG. 1 in an annular working configuration around an underwater structure.

FIG. 3 shows the underwater vehicle 2 in an annular working configuration, in which the underwater vehicle 2 surrounds the underwater structure A, which is formed here by a support pillar of an offshore wind turbine. The unfolded spacers 18 establish an even distance of the individual modules 4 of the underwater vehicle 2 from the underwater structure A to be examined. The underwater vehicle 2 can now be guided vertically along the length of the underwater structure A, which is columnar in the present case, and can carry out cleaning, inspection and/or maintenance work.

Figure 4A:
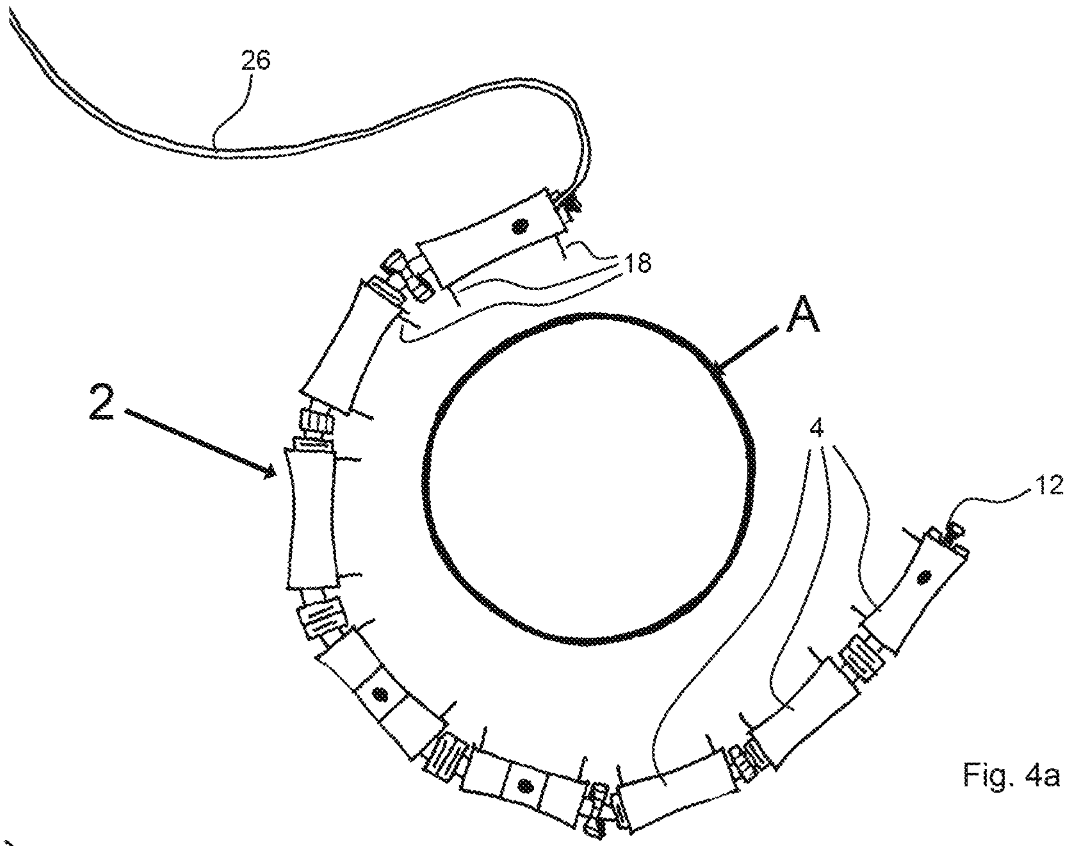
FIGS. 4*a* through 4*f* show schematically an underwater structure enclosed by the underwater vehicle according to an example embodiment of the invention according to FIG. 1.
Figure 4B:
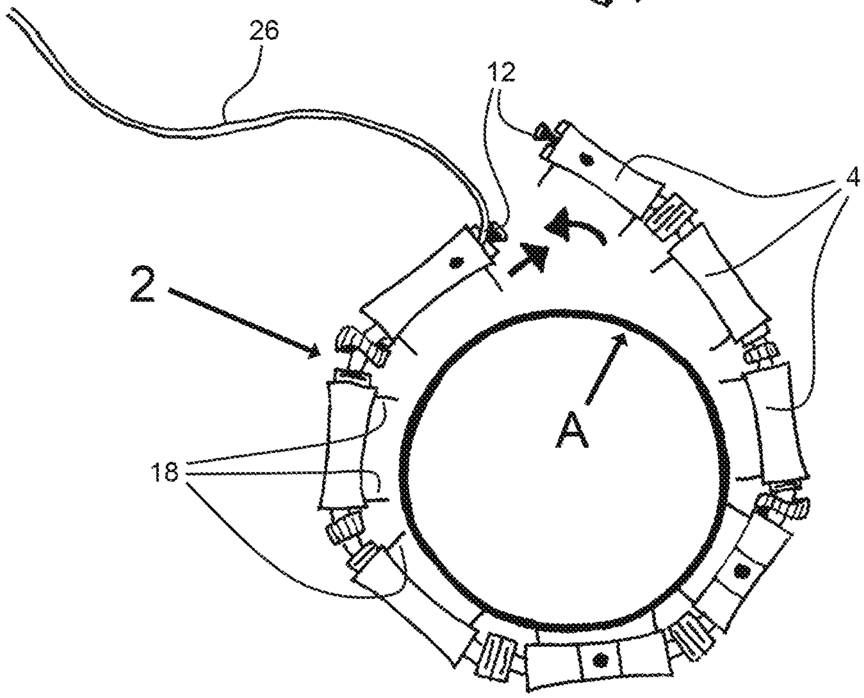

FIGS. 4*a*) to 4*f*) show how the underwater vehicle 2 is guided around a columnar underwater structure to be examined and transitioned from the elongated movement configuration to an annular working configuration. The spacers 18 are unfolded, while the underwater vehicle 2 is guided around the underwater structure A to be examined. By means of the coupling device 12, the underwater vehicle 2 is connected to itself in the annular working configuration to form a ring. In this annular working configuration, underwater vehicle 2 surrounds the underwater vehicle A to be examined. This prevents the underwater vehicle 2 from being removed from the underwater structure A to be examined, for example by currents. The subsequent examinations are therefore particularly easy and reliable to carry out.

Figure 4C:
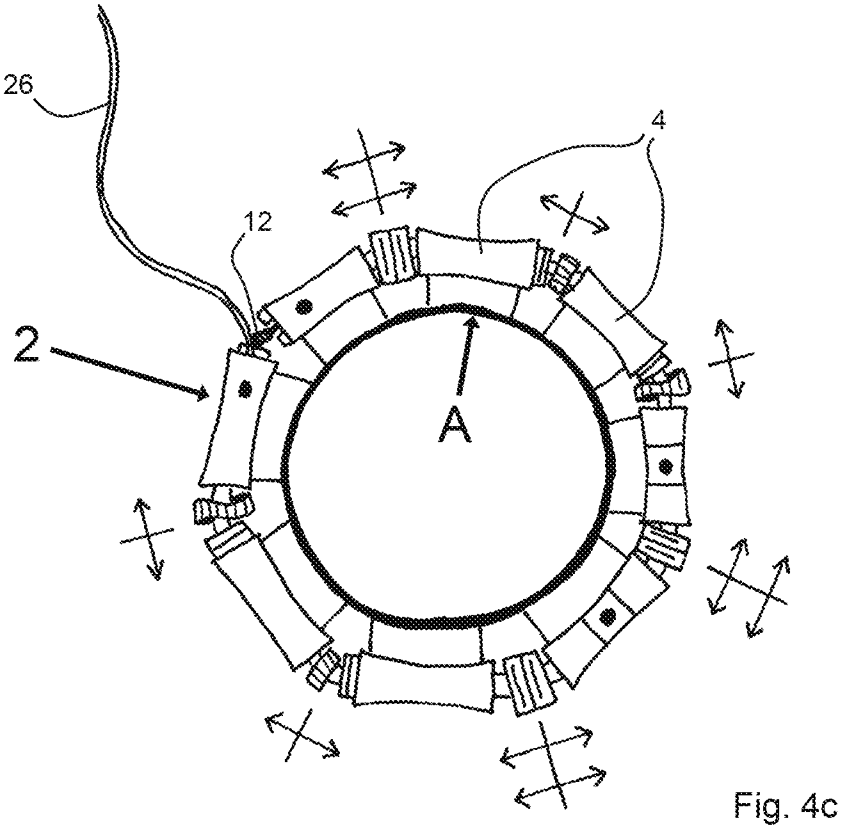
Figure 4D:
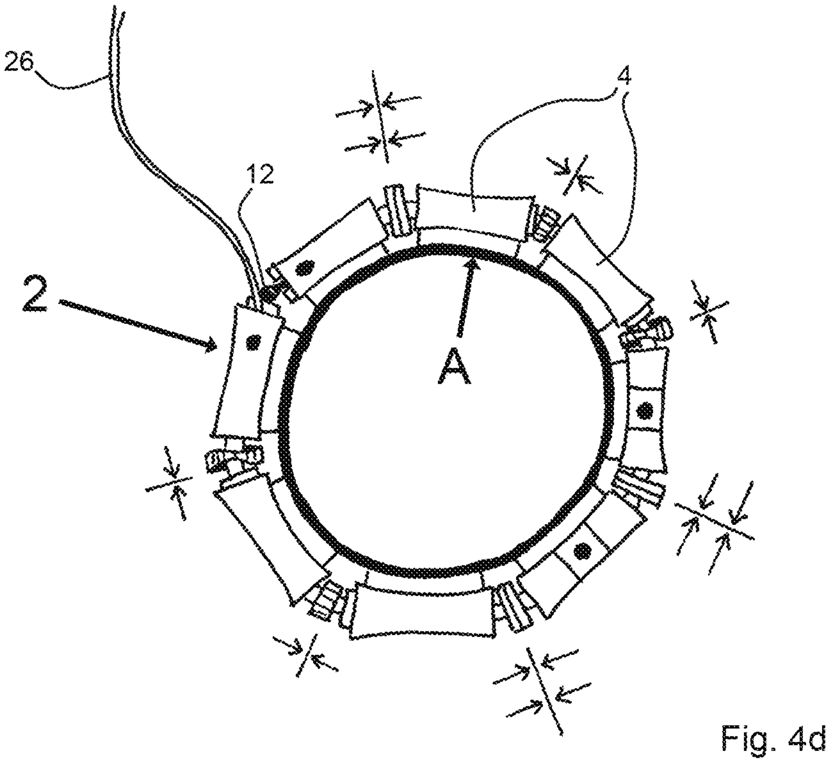

FIGS. 4*c*) and 4*d*) show an adaptation of the underwater vehicle 2 in the annular working configuration to the circumference of the underwater structure A. For this purpose, the distance of the individual modules 4 of the underwater vehicle 2 from each other can be changed. For this purpose, 4 connecting elements, the longitudinal dimensions of which can be changed, are inserted between the modules. In this exemplary embodiment, these are each realized by a cam gear that translates rotational movements into longitudinal movements. The distance between individual modules 4 can be increased or reduced. Thus, underwater structures A with slightly different diameters can be examined with an underwater vehicle 2. In the same way, underwater structures A with a changing diameter can be better examined, in that the underwater vehicle 2 in the annular working configuration can be continuously adapted to the currently existing diameter.

Figure 4E:
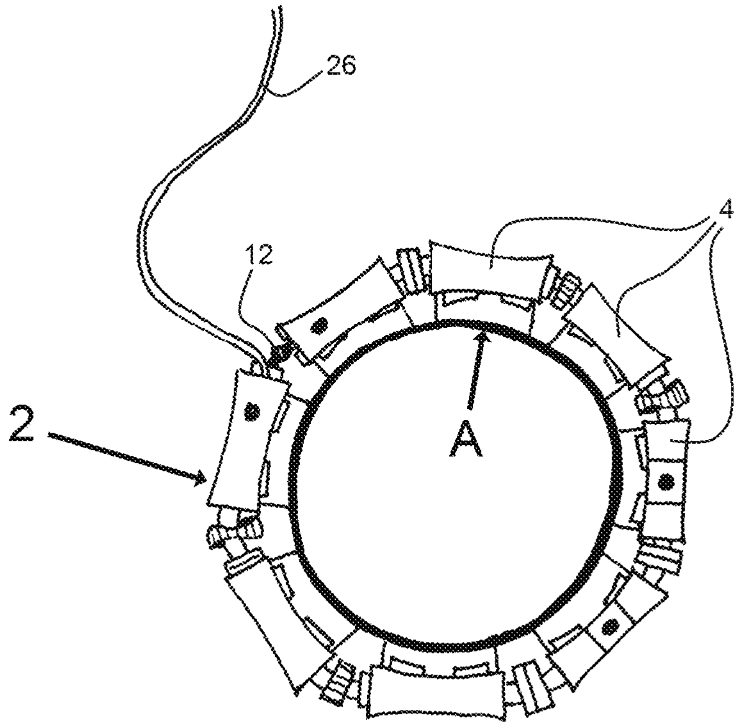
Figure 4F:
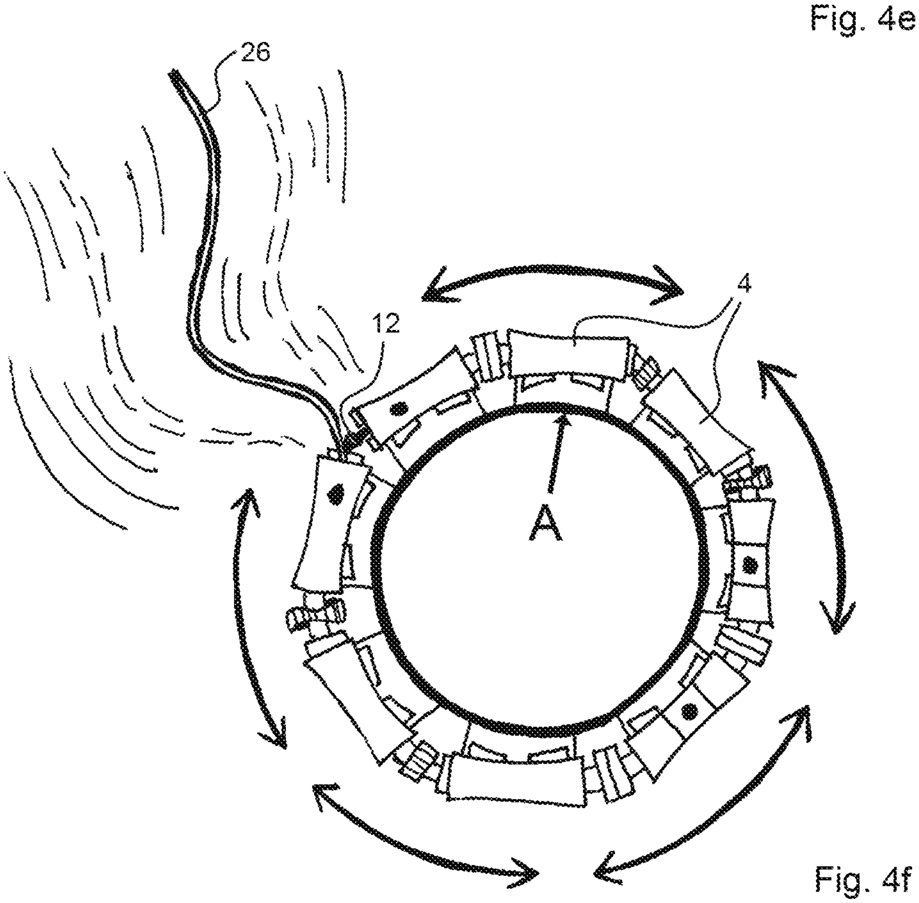

If underwater structures A with a significantly different diameter are then to be examined, the number of modules 4 can be varied or modules 4 with different longitudinal dimensions can be inserted into the underwater vehicle 2. Such a modular underwater vehicle 2 can thus be adapted for a variety of inspection tasks. FIGS. 4*e*) and 4*f*) show the underwater vehicle 2 in the annular working configuration, in which the ex-amination of the underwater structure A to be examined is carried out. Here, the underwater vehicle 2 can be moved not only along the longitudinal extent of the underwater structure A, but also in the circumferential direction. This ensures that the entire area of the underwater structure A to be examined is easily examined with an underwater vehicle 2.

Figure 5A:
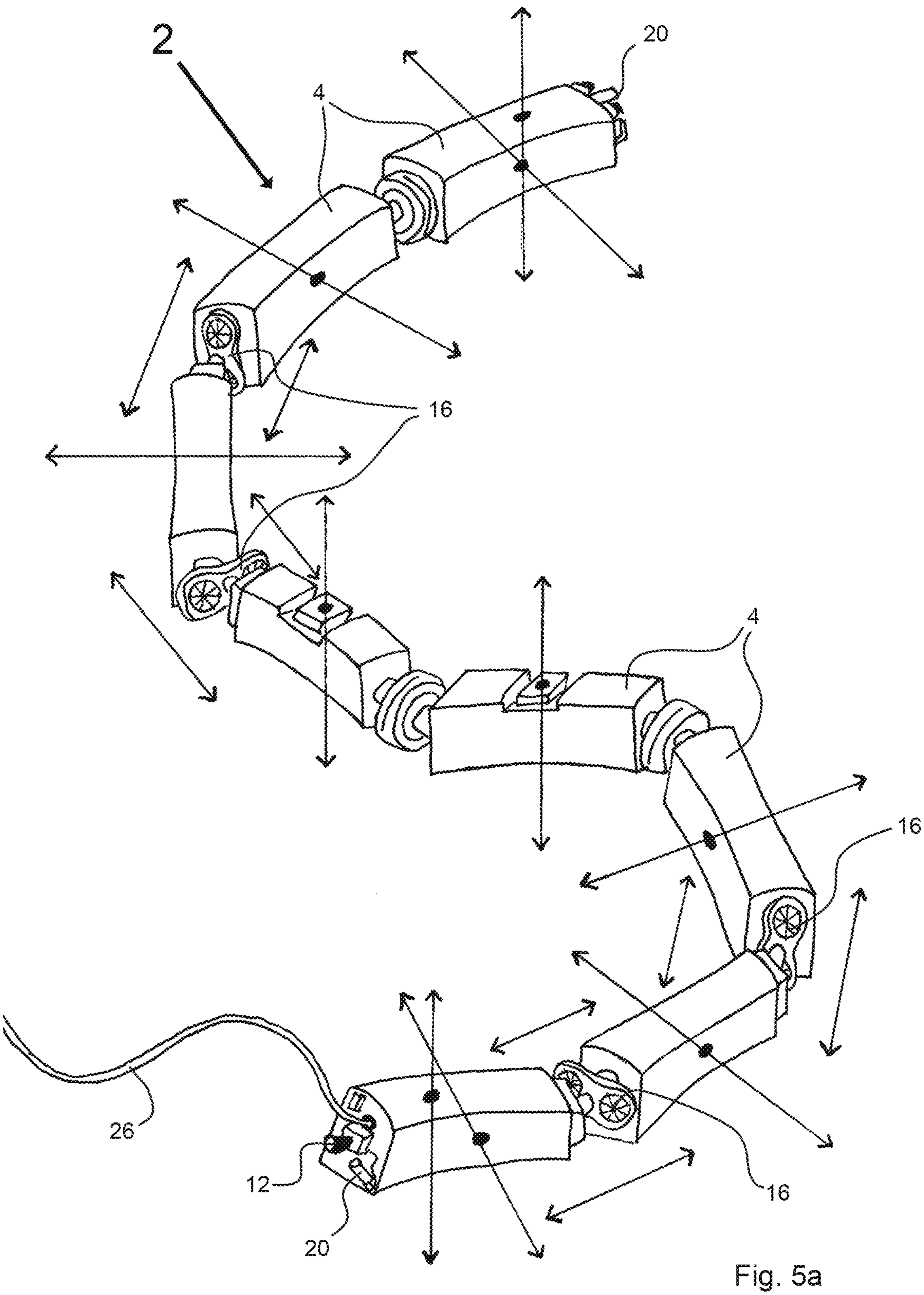
FIGS. 5*a* through 5*b* show schematically the arrangement of the propulsion elements on the underwater vehicle according to FIG. 1.
Figure 5B:
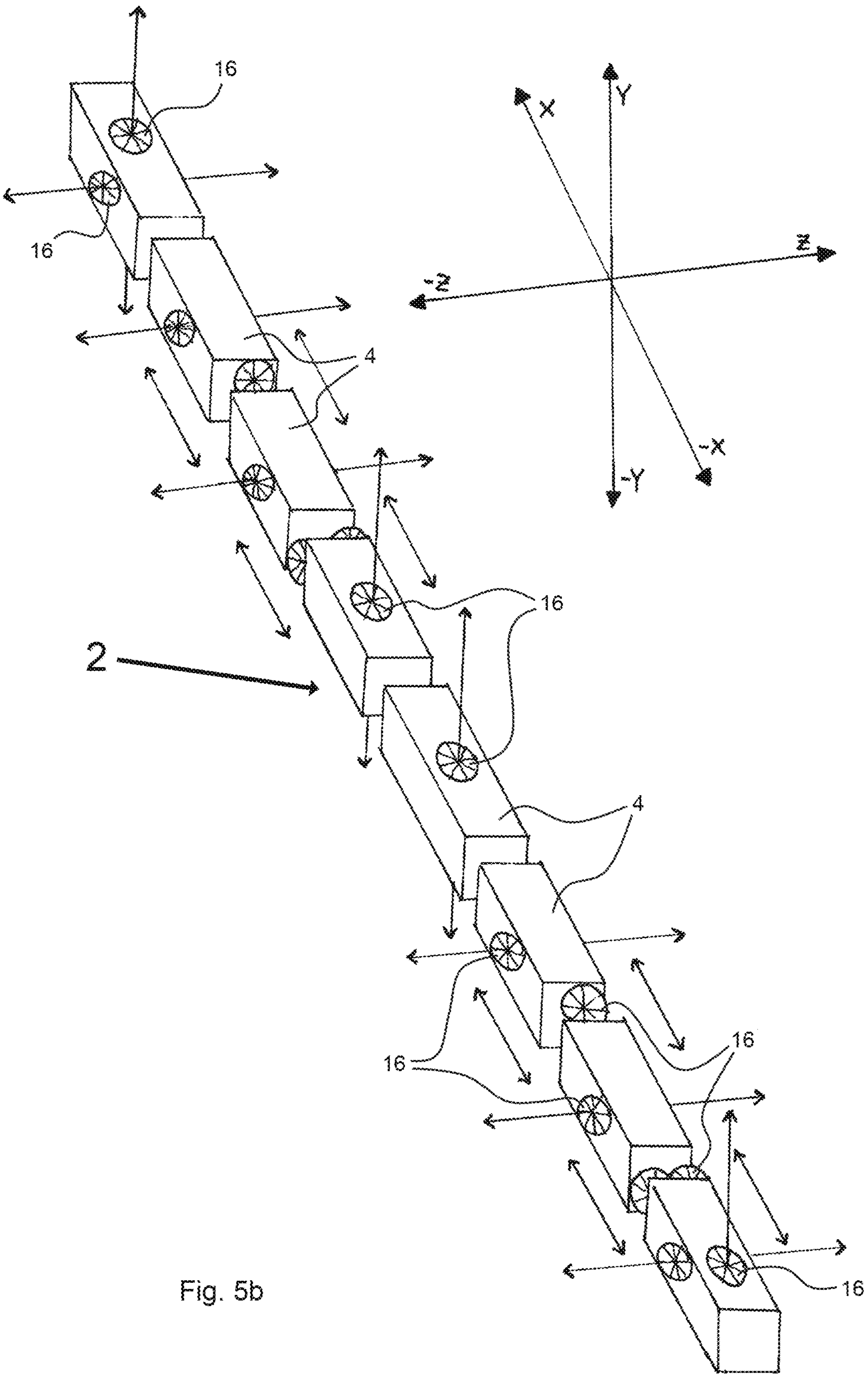

FIGS. 5*a*) and 5*b*) show schematically the orientation of the different propulsion elements. FIG. 5*a*) shows that the propulsion elements 16 can point in different directions. FIG. 5*b*) shows that the propulsion elements 16 in a fully extended underwater vehicle 2 are aligned in one of three orthogonal spatial directions X, Y and Z. This arrangement of the propulsion elements 16 allows an underwater vehicle 2 which can be easily moved in different directions. For this purpose, individual propulsion elements are integrated into the modules, while other propulsion elements 16 are arranged between two modules.

Alternatively or additionally, it is also conceivable to arrange propulsion elements 16 in an orientable manner so that they can be oriented in operation in such a way that they are effective in the desired spatial direction. For this purpose, the propulsion elements can be controlled independently of each other in order to enable even complex movements of the underwater vehicle 2, such as the transition from an elongated movement configuration to a U-shaped, c-shaped, spiral or annular working configuration supported by the propulsion elements 16.

Figure 6A:
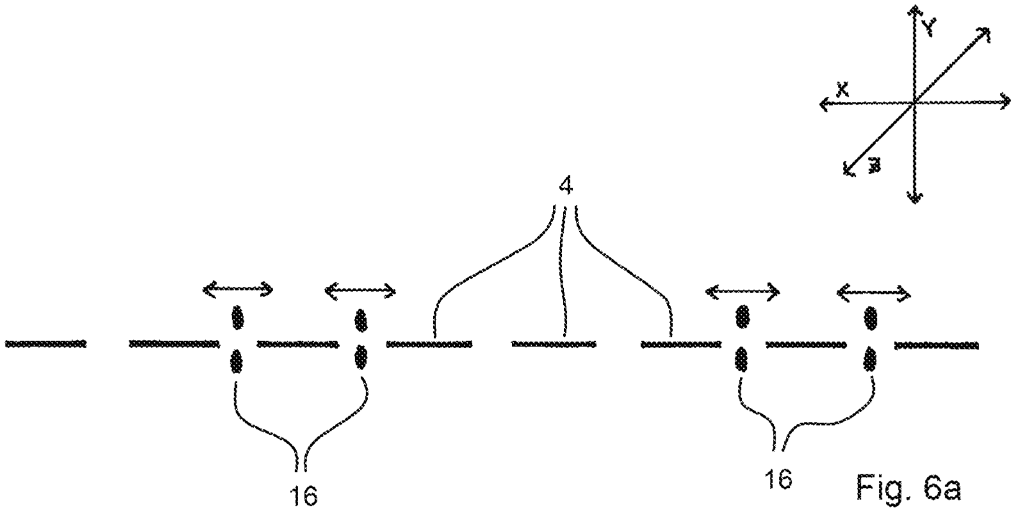
FIGS. 6*a* through 6*c* show schematically the possible directions of movement of the underwater vehicle according to FIG. 1.
Figure 6B:
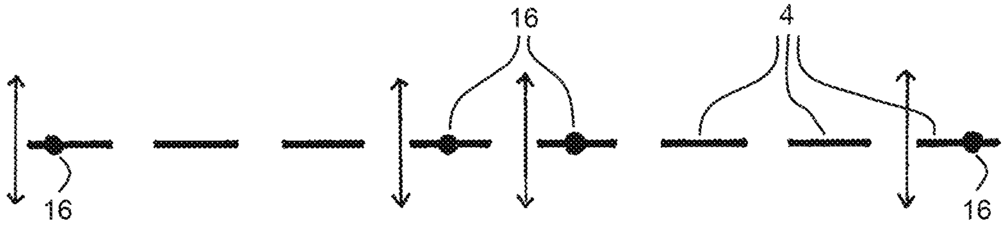
Figure 6C:
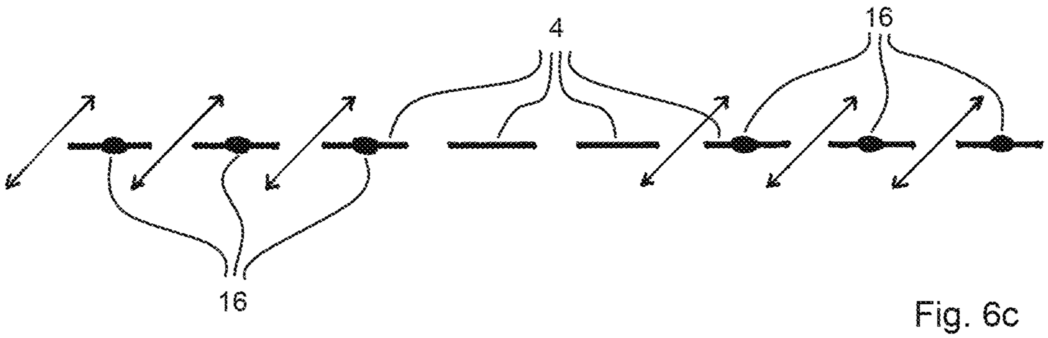
Figure 7:
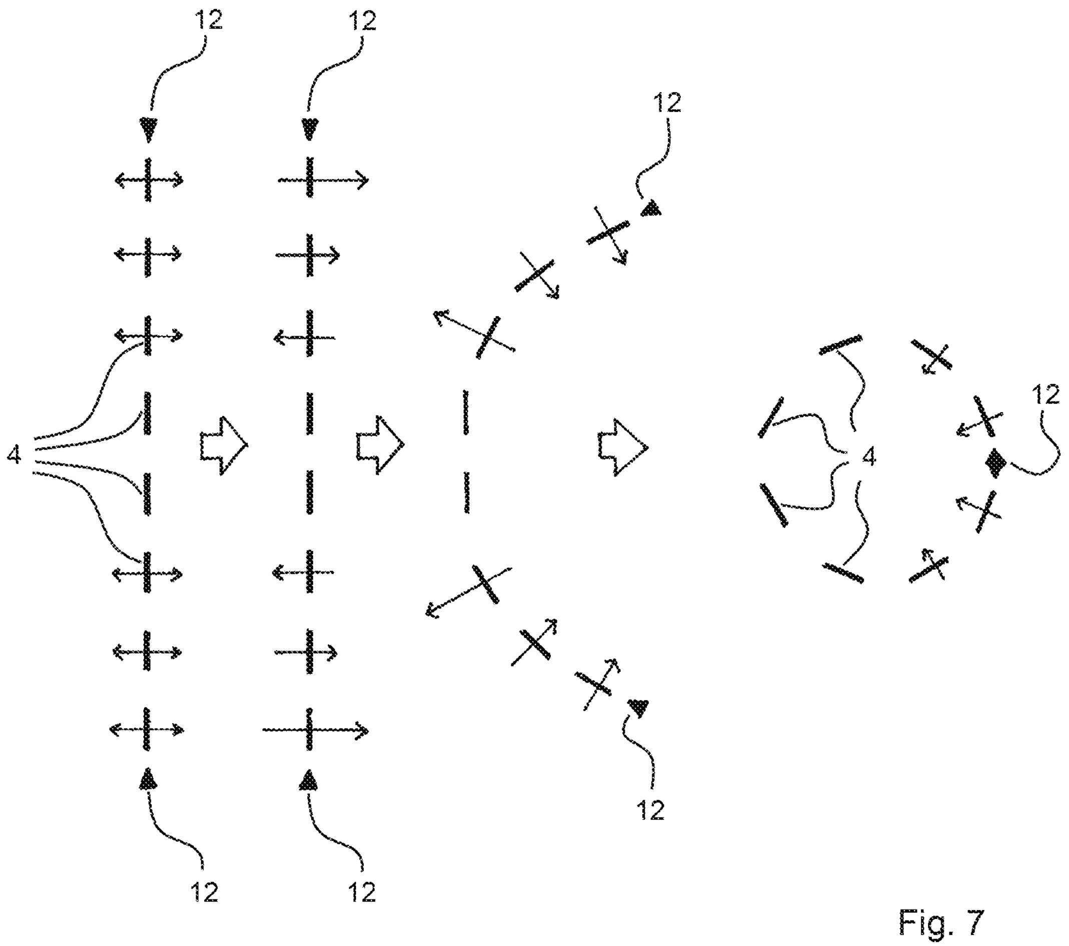
FIG. 7 shows schematically the use of the propulsion elements during the transition of the underwater vehicle from a movement configuration to a working configuration.

FIGS. 6*a*) to 6*c*) show exemplary possible arrangements of the propulsion elements 16 on the underwater vehicle 2 which act in different spatial directions. FIG. 6*a*) shows the propulsion elements 16 acting in the direction of the longitudinal extent, which are mainly used for horizontal movements in the direction of the longitudinal extent of the underwater vehicle 2. FIG. 6*b*) shows the arrangement of propulsion elements acting in a vertical direction on the underwater vehicle 2. These can be used, for example, to move the underwater vehicle 2 in a working configuration past the underwater structure A to be examined. FIG. 6*c*) shows the arrangement of the propulsion elements 16 acting in a lateral direction. This allows the underwater vehicle 2 to be moved in appropriate lateral directions. These are necessary in the present embodiment, especially for the transition of the underwater vehicle 2 from an elongated movement configuration to a U-shaped, c-shaped, spiral and/or annular working configuration, as shown in FIG. 7 for a U-shaped and an annular working configuration. For this purpose, the propulsion elements acting in a lateral direction are controlled to varying degrees and act in different directions. While the propulsion elements 16 arranged at the centre of the underwater vehicle 2 generate outwards propulsion, the propulsion elements 16 arranged at the ends of the underwater vehicle 2 are used to generate inward propulsion towards the space to be surrounded by the underwater vehicle 2 in the working configuration. This happens until the under-water vehicle 2 is transitioned, for example, into an annular working configuration and is connected to itself in this configuration by the coupling device 12.

Figure 8:
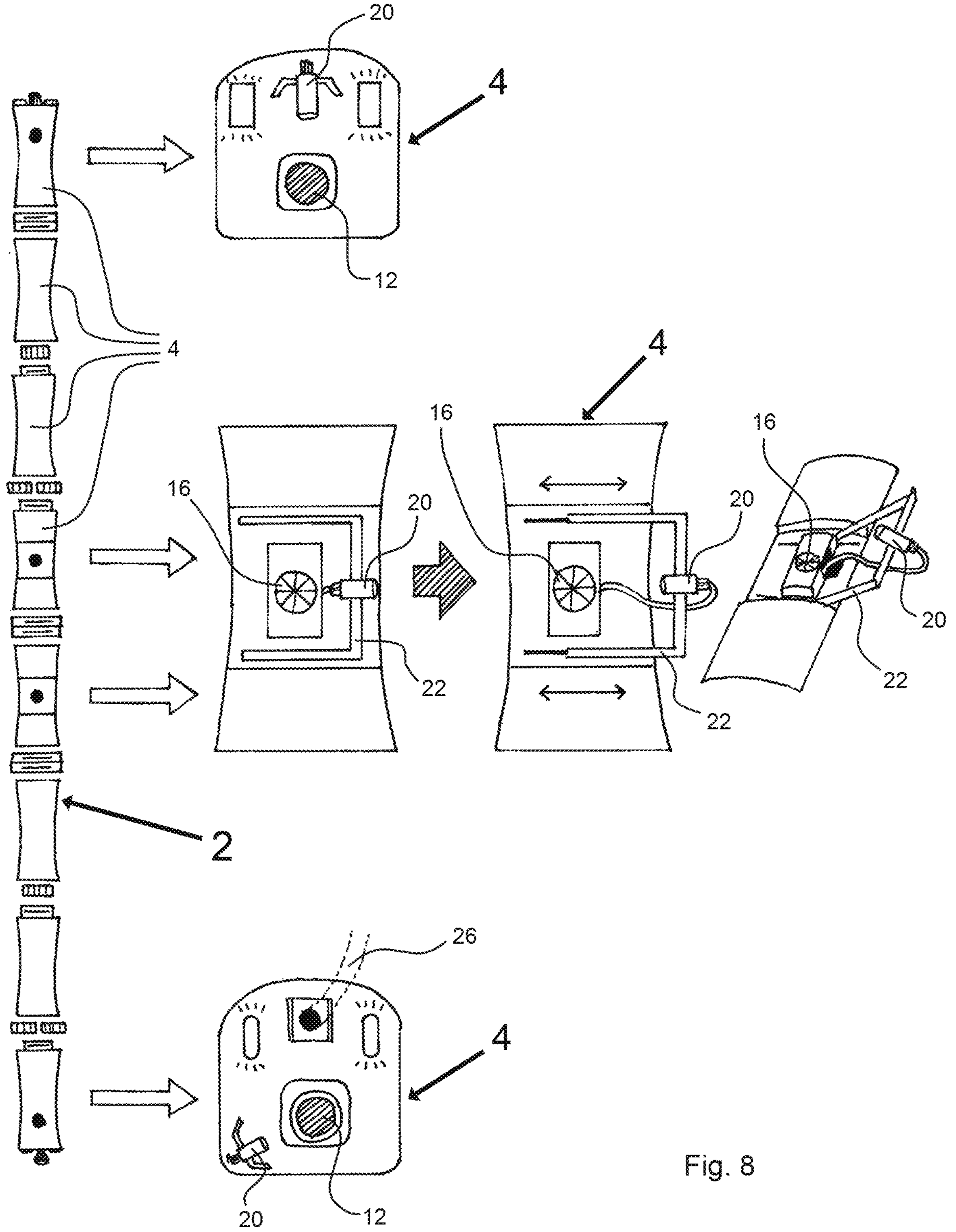
FIG. 8 shows schematically the arrangement of cameras on the underwater vehicle according to FIG. 1.

FIG. 8 shows on the basis of the exemplary embodiment possible arrangements of cameras 20 on the underwater vehicle 2. In this exemplary embodiment, cameras 20 are arranged on the first and last module 4 of the underwater vehicle 2. These cameras 20 allow on the one hand a recording of the environment when moving the underwater vehicle 2 and on the other hand the monitoring of a coupling process of the underwater vehicle 2 to underwater structures A or to itself. In addition to the cameras 20, light sources are arranged that can illuminate the area to be captured by the cameras 20. Cameras 20 are arranged on central modules 4, which can be oriented or displaced by an adjusting device 22. In particular, the camera 20 can be transferred by the adjusting device 22 in the exemplary embodiment to a position spaced apart from the module 4 on which the camera 20 is fixed by the adjusting device 22. The camera 20 can thus be transported compactly on the underwater vehicle 2. In the position spaced apart from the module 4 to which the camera 20 is fixed, the camera 20 can capture a wide area and, for example, can look past the module 4 so to speak. Likewise, the camera 20 can also capture the module 4 to which it is fixed, and thus allows a check of the position of the module 4 of the underwater vehicle 2, for example relative to an underwater structure A and/or the monitoring of a cleaning or inspection process.

Figure 9:
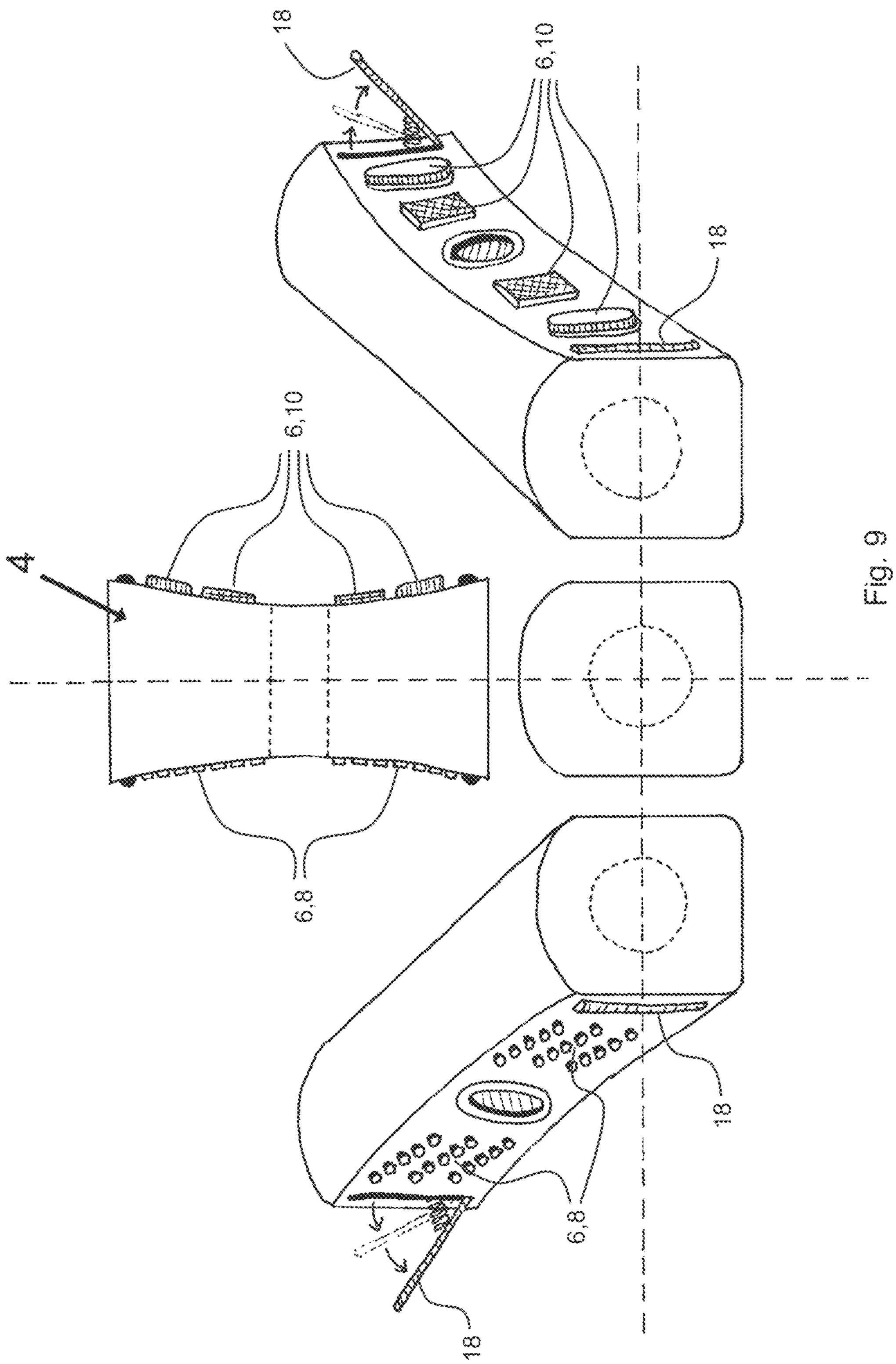
FIG. 9 shows schematically a module according to an example embodiment of the invention of the underwater vehicle according to FIG. 1 with the spacers in an unfolded position and a folded position.

FIG. 9 shows a module 4 of an underwater vehicle 2. In this figure, on the one hand, a flow channel for a propulsion element 16 arranged in module 4 can be seen. Furthermore, it can be seen that the module 4 comprises working equipment 6 on two sides, wherein on one side the working equipment 6 is implemented as inspection equipment 8 and on the other side is implemented as working equipment 10. The sides of the module 4 with the working equipment 6 are concave and each have a straight section in a cross-section transverse to a longitudinal extent direction of the module 4. As a result, the working equipment 6 in a working position of the underwater vehicle 2 can act better on an underwater structure A to be examined if it is an underwater structure A with a round cross-section or rounded sections. Furthermore, spacers 18 are arranged adjacent to the working equipment 6, which are shown in an unfolded position and in a folded position. The spacers 18 preferably also have damping means. The spacers 18 can thus not only serve to keep the working equipment 6 at a predetermined distance from the underwater structure A to be examined, but also to dampen movements of the underwater vehicle 2 or the module 4 relative to the underwater structure A and thus to avoid damage to the module 4 or the working equipment 6. The movable spacers 18 enable a compact underwater vehicle 2. The spacers 18 are only extended when they are needed.

Figure 10A:
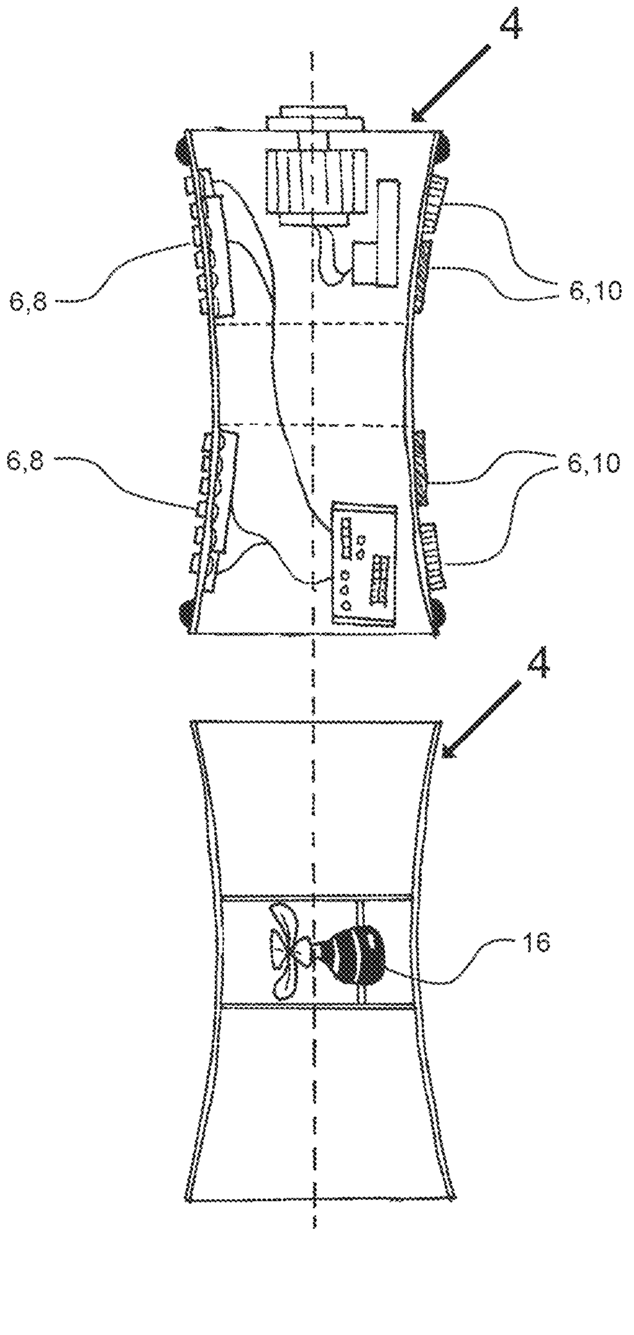
FIG. 10*a* shows schematically a longitudinal section through a module according to an example embodiment of the invention.

FIGS. 10*a*) and 10*b*) show sections through a module 4 of an underwater vehicle. In the longitudinal section (FIG.

10*a*), a data collection unit connected to the inspection device 8 is shown. This is where the data of the inspection equipment 8 are recorded.

Figures 2, 10B:
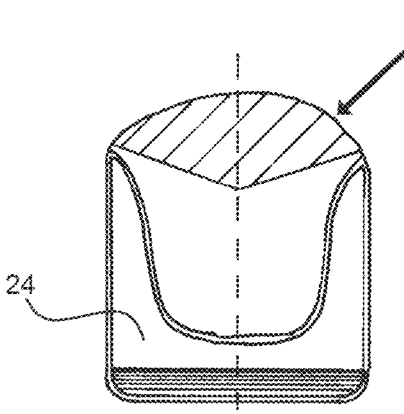
FIG. 10*b* shows schematically a cross-section of a module of the underwater vehicle according to FIG. 1 with a ballast tank.
Figures 3, 10B:
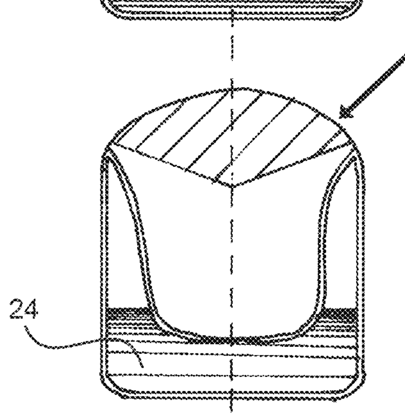
Figures 1, 10B:
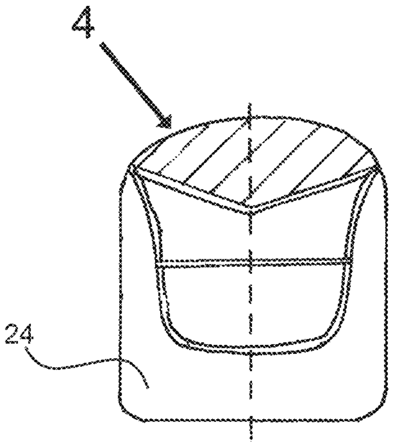
Figures 4, 10B:
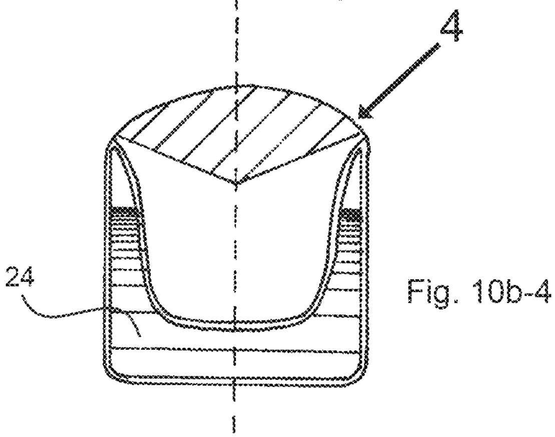

Furthermore, a motor is arranged in the module. As a result, the individual modules 4 can be oriented relative to each other and/or can be changed in their distance from each other. Likewise, the propulsion elements 16 can be driven by such a motor. In a cross-section (FIG. 10*b*)) of the module, a ballast tank 24 can be seen. The modules 4 are designed to be buoyant. The ballast tank 24 is filled with a gaseous and compressible medium. The water surrounding the module can be introduced into the ballast tank 24 and the gaseous medium compressed. The water can also be removed from the ballast tank 24. This enables the net buoyancy of module 4 to be precisely adjusted.

Figure 11A:
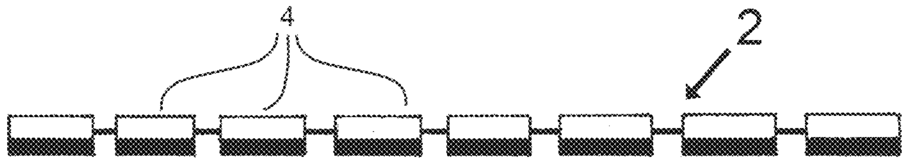
FIGS. 11*a* through 11*d* show schematically an underwater vehicle according to an example embodiment of the invention and according to FIG. 1 in different floating states.
Figure 11B:
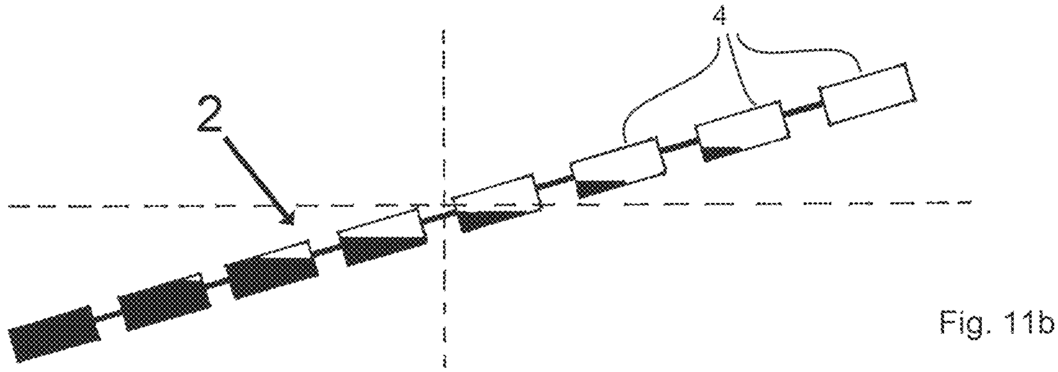
Figure 11C:
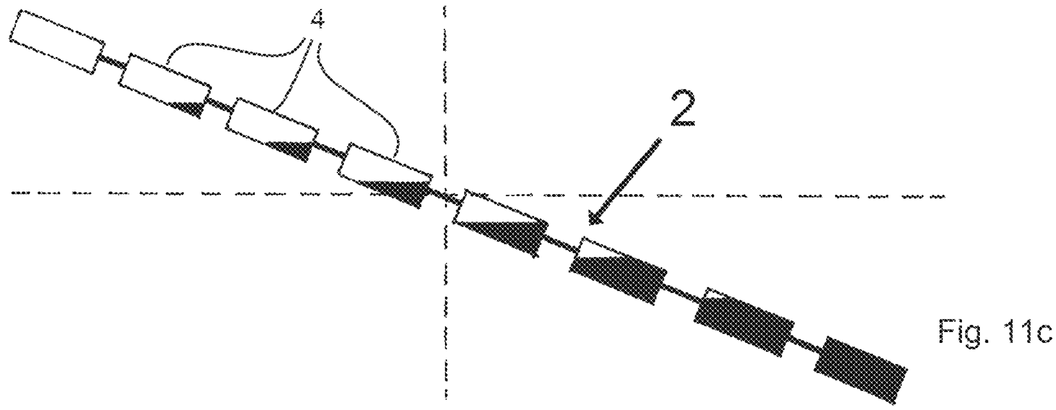

FIGS. 11*a*) to 11*d*) show the different orientations that an underwater vehicle according to the invention can assume by clever ballasting of ballast tanks 24, which are present in each module 4 of the underwater vehicle 2 in this exemplary embodiment. The ballast tanks 24 can be filled at the same time, so that the underwater vehicle orients horizontally in the water (FIG. 11*a*)). However, the ballast tanks 24 of individual modules can also be filled differently. In the extended movement configuration of the underwater vehicle 2, the underwater vehicle 2 can thus deviate from the horizontal orientation and, if necessary, can dive up or down faster under the action of the propulsion elements 16 (FIGS. 11*b*) and 11*c*)). Individual ballast tanks 24 may also be fluidically connected to each other, for example by flexible connections, so that at least one fluid can be transferred from one ballast tank 24 to another ballast tank 24 to allow trimming, i.e. a certain orientation of the underwater vehicle.

Figure 11D:
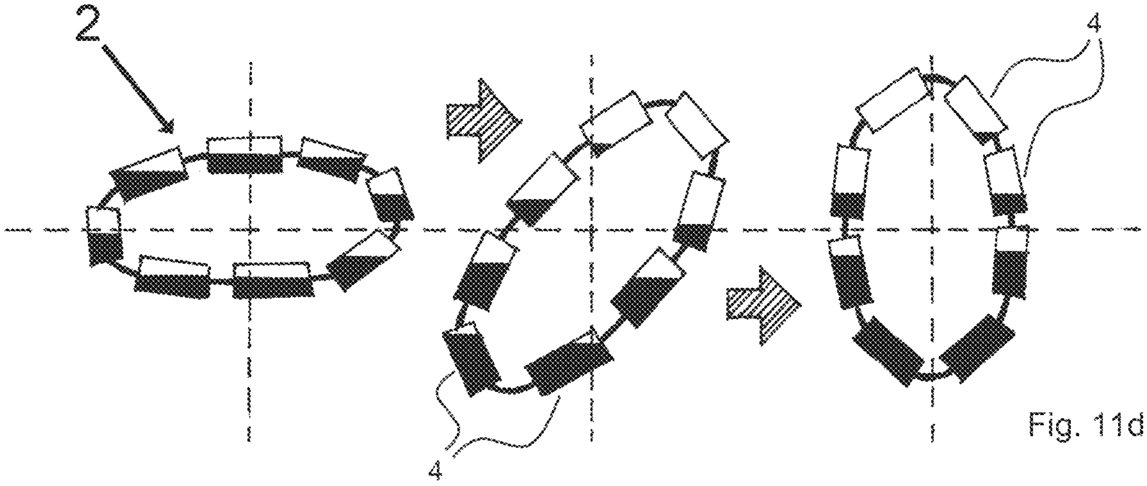

In an annular working configuration, the orientation of the ring can be changed by the different ballasting of the ballast tanks 24 of the modules 4 (FIG. 11*d*)). On the one hand, the ring can be oriented horizontally. In this orientation, the underwater vehicle 2 is particularly suitable for the inspection of vertical structures, such as support pillars of wind turbines. With different ballasting, the underwater vehicle is vertically oriented in the annular working configuration. In this orientation, the underwater vehicle 2 is particularly suitable for investigating horizontally arranged underwater structures A, such as pipelines. However, the underwater vehicle 2 is not limited to use on horizontally or vertically oriented underwater structures A. Especially in the annular working configuration, it can be guided along arbitrarily oriented structures such as flexible undersea pipes.

Figure 12:
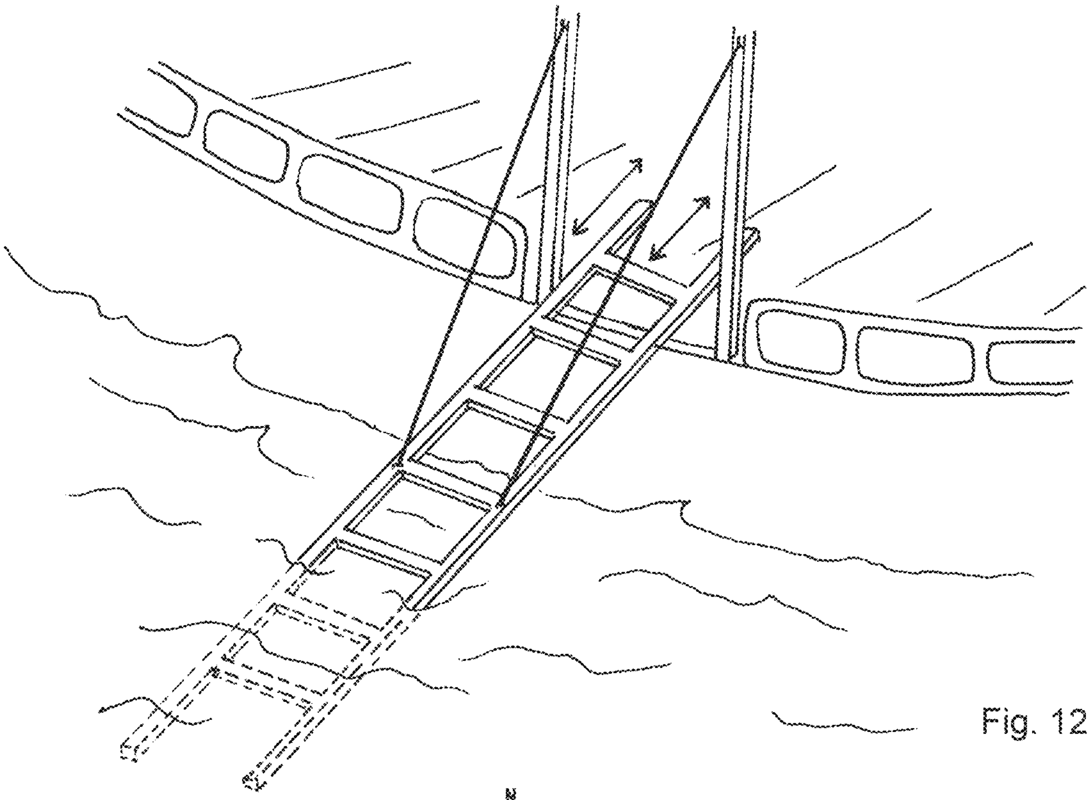
FIG. 12 shows schematically a launch and recovery system for an underwater vehicle according to an example embodiment of the invention and according to FIG. 1.
Figure 13:
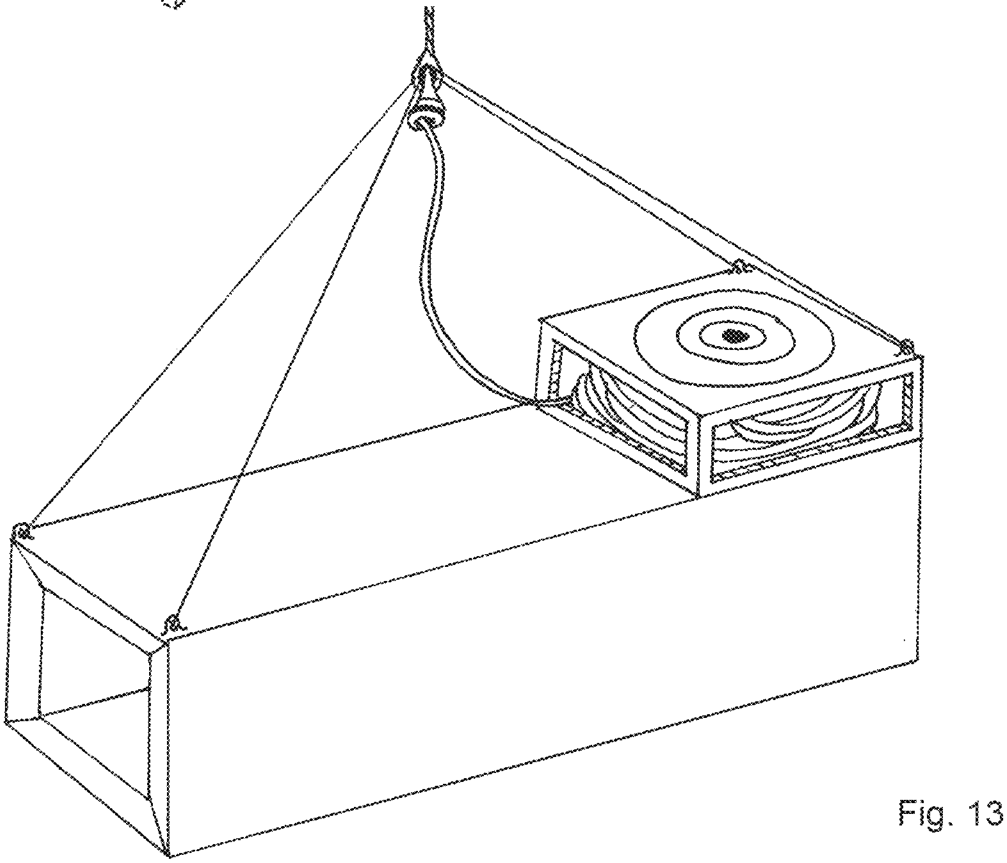
FIG. 13 shows schematically an alternative embodiment of a launch and recovery system for an underwater vehicle according to FIG. 1.

FIG. 12 shows a launch and recovery system for an underwater vehicle 2 according to the invention. The launch and recovery system can be based on a ship. It is also conceivable to use a launch and recovery system that moves the underwater vehicle close to the application site, wherein the launch and recovery system remains close to the application site and the underwater vehicle 2 is used with the launch and recovery system. For this purpose, the launch and recovery system can be equipped with a tether management system (TMS) (FIG. 13)). Such a tether management system ensures that the supply cable 26 functions perfectly in deeper waters, restricts the maneuverability slightly and does not get tangled, for example.

Figure 14:
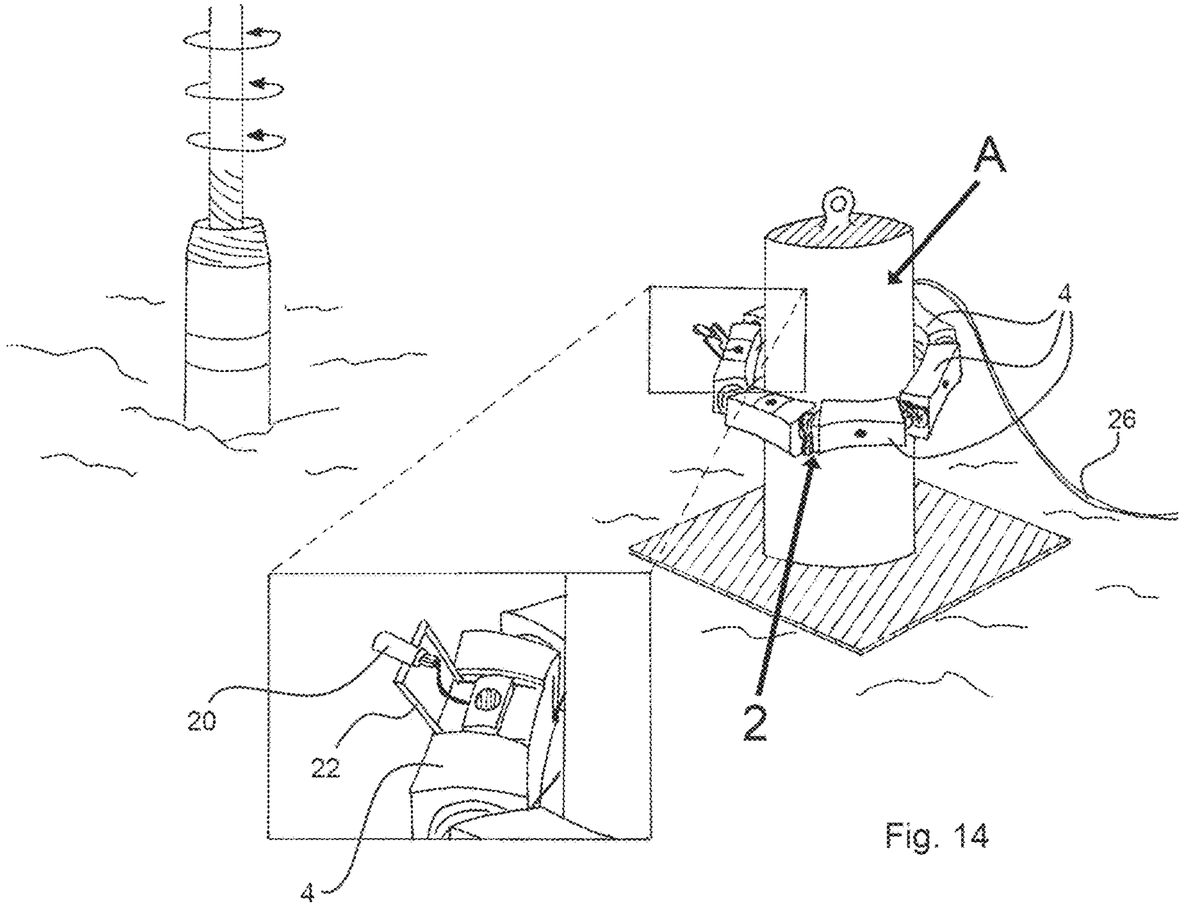
FIG. 14 shows schematically an alternative application of an underwater vehicle according to FIG. 1.

FIG. 14 shows an alternative application scenario for an underwater vehicle 2 which is fixed to a temporary auxiliary structure to monitor a process carried out underwater, such as drilling a borehole. The underwater vehicle 2 can also monitor another underwater structure that is different from the underwater structure to which it is fixed.

Figure 15:
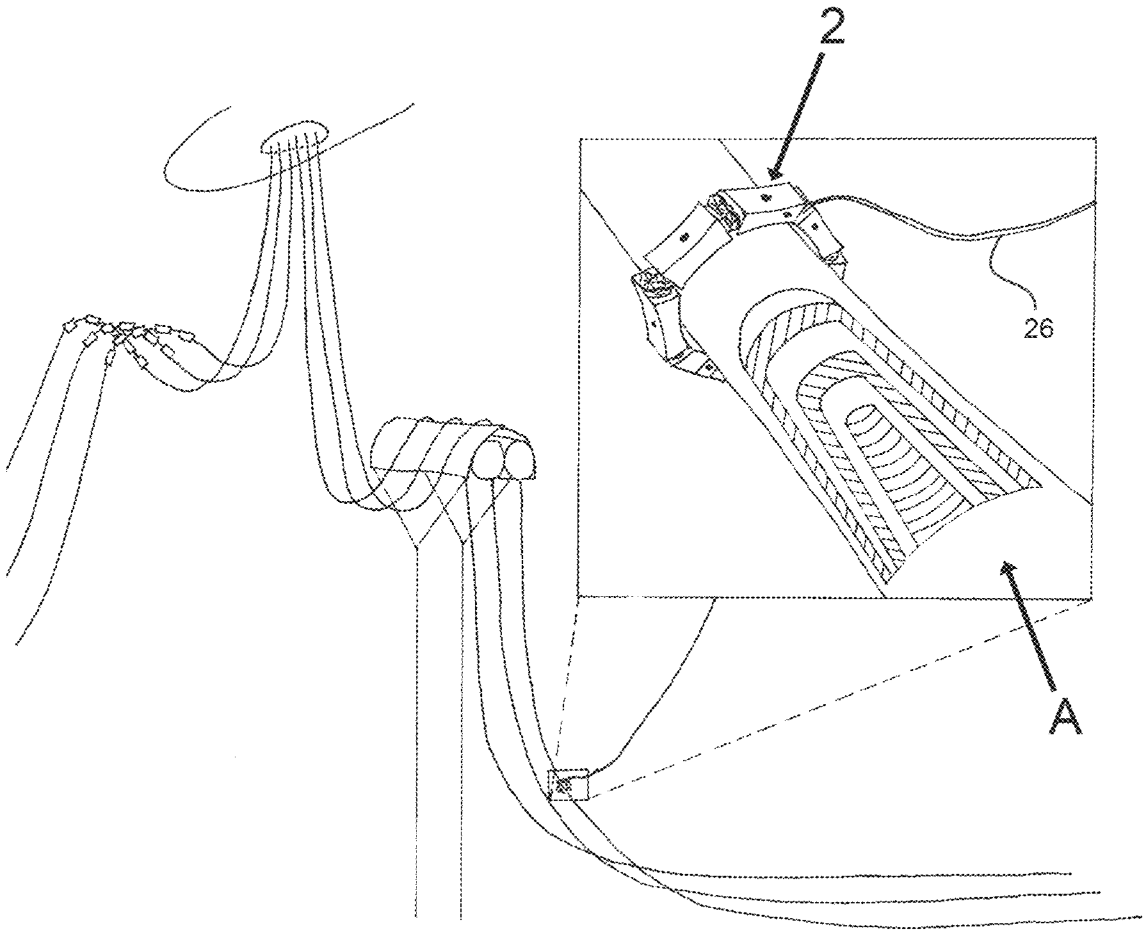
FIG. 15 and FIG. 16 show schematically further examples of possible applications of an underwater vehicle according to FIG. 1.

FIG. 15 shows the use of the underwater vehicle for the inspection of flexible pipelines.

Figure 16:
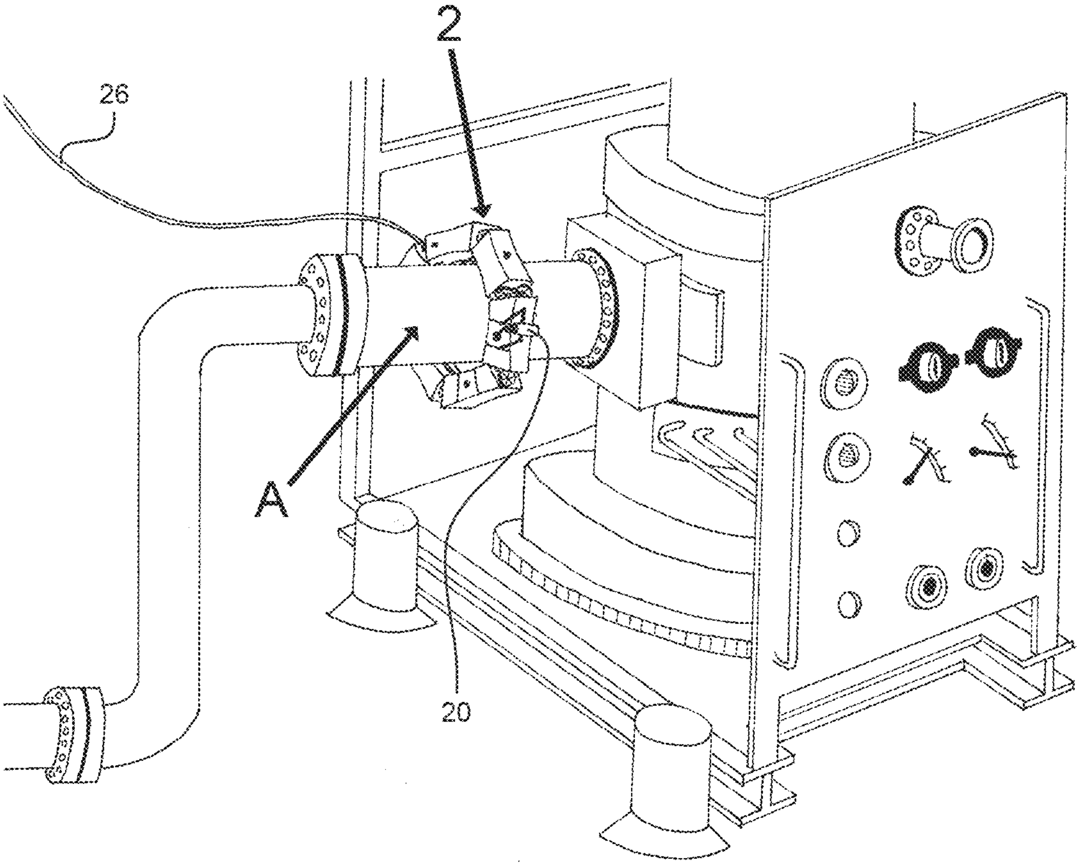

FIG. 16 shows the use of such a system in the monitoring of connections to an underwater borehole termination. Here too, the underwater vehicle 2 can indirectly monitor an underwater structure which is different from the underwater structure to which it is fixed. In this case, the underwater vehicle 2 must operate in a spatially limited environment. In such an environment, the underwater vehicle 2 according to the invention is particularly flexible to use, since it is introduced in the elongated movement configuration to the point to be inspected and only there is transitioned into the U-shaped, C-shaped, spiral or annular working configuration.

FIGS. 17*a*) to e) show a carrier vehicle 32 of an underwater vehicle system 30 in different positions. FIG. 17*a*) is a view from above. FIG. 17*b*) shows a side view without the underwater vehicle 2. FIG. 17*c*) shows the carrier vehicle 32 in a side view with an underwater vehicle 2. The underwater vehicle 2 is fixed to the carrier vehicle 32 by fastening means 34 of the carrier vehicle 32. FIG. 17*d*) shows the carrier vehicle 32 with the underwater vehicle 2 fixed to it by the fastening means 34 in a view from below. FIG. 17*e*) shows a cross-section through the carrier vehicle in a view according to FIG. 17*b*).

The carrier vehicle 32 is constructed similarly to the underwater vehicle 2 of multiple interconnected modules which can be oriented relative to each other. The modules are connected to each other in an articulated manner by linkage sections 33 with linkage arrangements 35. The carrier vehicle of the exemplary embodiment has a control module 36, two drive modules 38 with drive devices 40, a battery module 42 and a TMS module 44 with a tether management system 46. The tether management system 46 comprises the supply cable 26, with which the underwater vehicle 2 is connected to the carrier vehicle 32. The carrier vehicle 32, like the underwater vehicle 2, can be transitioned into an annular configuration in which it is connected to itself by connecting devices 48. The connecting devices 48 are arranged on the control module 36 and on the rear of the two drive modules 38. In particular, mechanical and/or (electro-)magnetic fixing of the carrier vehicle 32 to itself in an annular working configuration or to a structure in the water is carried out by means of the connecting devices 48.

Contact blocks 50, by means of which the underwater vehicle 2 is brought into contact with the carrier vehicle 32, are formed on the TMS module 44 and on the battery module 42. The contact blocks 50 serve to avoid possible damage to the carrier vehicle 32 and the underwater vehicle 2 when separating the underwater vehicle 2 and in particular when recovering the underwater vehicle 2 by the fastening means 34 of the carrier vehicle 32.

In the cross-section according to FIG. 17*e*) it can be seen that an accumulator 43 is arranged in the battery module 42. An additional accumulator 45 is arranged in the TMS module 44 in addition to the tether management system 46 with the supply cable 26. A control unit 51, various sensors, in particular navigation sensors 52 such as a compass, depth gauge and/or sonar device and means 54 for in particular satellite-based positioning and/or communication are arranged in the control module 36. The position of the carrier vehicle 32 can be determined accurately by means for in particular satellite-based positioning, in particular on the basis of GPS, Galileo, Beidou and/or Glonass. By means for in particular satellite-based communication, the carrier vehicle 32 remaining on the water surface or near the water surface can serve as a communication node in a communication link with the underwater vehicle 2 in use.

Furthermore, a camera system 56 with a camera and lighting equipment is arranged in the control module 36.

FIGS. 18*a*) and b) show the underwater vehicle system 30, once with the underwater vehicle 2 fixed to the carrier vehicle 32 by the fastening means 34 (FIG. 18*a*)) and once with the underwater vehicle 2 spaced apart from the carrier vehicle 32, wherein the underwater vehicle 2 is connected to the carrier vehicle 32 by a supply cable 26.

The invention claimed is:

1. An underwater vehicle for cleaning, inspection and/or monitoring of underwater structures A, the underwater vehicle comprising:

at least one working equipment for cleaning, inspection and/or monitoring of the underwater structures A, several interconnected modules which can be oriented relative to each other, wherein the several interconnected modules are arranged one behind the other, wherein the underwater vehicle can be transitioned from an elongated movement configuration into an annular working configuration and back, wherein at least two modules have foldable spacers and/or working equipment, wherein the foldable spacers and/or the working equipment are arranged at the modules on at least two sides transverse to the module's longitudinal direction;

wherein the underwater vehicle is transitionable into at least two different working configurations, wherein in each of the working configurations a different side of the module is oriented towards a space surrounded by the underwater vehicle in the working configuration.

2. The underwater vehicle as claimed in claim 1, further comprising at least one coupling device by which the underwater vehicle is connectable to itself in the annular working configuration.

3. The underwater vehicle as claimed in claim 2, the coupling device has at least one magnet.

4. The underwater vehicle as claimed in claim 1, further comprising at least one means of repair.

5. The underwater vehicle as claimed in claim 1, wherein a distance between two modules is adjustable.

6. The underwater vehicle as claimed in claim 1, wherein at least the modules having working equipment are concave in an area in which the working equipment is arranged.

7. The underwater vehicle as claimed in claim 1, wherein at least the modules on which working equipment are arranged laterally have a cross-section transverse to a longitudinal extent direction of the modules with at least one straight section.

8. The underwater vehicle as claimed in claim 1, further comprising at least two propulsion elements which are arranged in and/or on a module and/or between two modules, and wherein at least two of these propulsion elements are effective in different spatial directions.

9. The underwater vehicle as claimed in claim 8, wherein the propulsion elements are effective in each case in one of three orthogonal spatial directions in a fully extended arrangement of the underwater vehicle.

10. The underwater vehicle as claimed in claim 8 wherein the propulsion elements can be individually controlled and/or oriented.

11. The underwater vehicle as claimed in claim 1, further including at least one camera.

12. The underwater vehicle as claimed in claim 11, wherein the camera can be moved and/or oriented by an adjusting device.

13. The underwater vehicle as claimed in claim 1, wherein at least one module is buoyant.

14. The underwater vehicle as claimed in claim 1, wherein at least one module has a ballast tank.

15. The underwater vehicle as claimed in claim 1, wherein the underwater vehicle is connected by a supply cable directly or indirectly to a land-based, airborne and/or sea-based control unit.

16. The underwater vehicle as claimed in claim 1, further comprising a control unit and a navigation unit with a data transmission connection to the control unit, wherein the control unit is set up for at least partially autonomous control of the underwater vehicle.

17. The underwater vehicle as claimed in claim 1, further comprising means for optical data transmission.

18. An underwater vehicle for cleaning, inspection and/or monitoring of underwater structures A, the underwater vehicle comprising:

an underwater vehicle for cleaning, inspection and/or monitoring of underwater structures A as claimed in claim 1;

a carrier vehicle, wherein the carrier vehicle and/or the underwater vehicle has at least one fastening means for fixing the underwater vehicle to the carrier vehicle;

wherein the carrier vehicle has a control unit which is set up to carry out at least partially autonomous operation of the carrier vehicle.

19. The underwater vehicle system as claimed in claim 18, wherein the carrier vehicle has multiple interconnected modules which can be oriented relative to each other.

20. The underwater vehicle system as claimed in claim 19, wherein the carrier vehicle can be transitioned from an elongated movement configuration to at least an annular deployment configuration.

21. The underwater vehicle system as claimed in claim 20, wherein the carrier vehicle has connecting means by means of which the carrier vehicle can be connected to itself in the annular deployment configuration.

22. The underwater vehicle system as claimed in claim 18, wherein the carrier vehicle has at least one energy storage means.

23. The underwater vehicle system as claimed in claim 18, wherein the carrier vehicle and/or the underwater vehicle have equipment for light-based communication.

24. The underwater vehicle system as claimed in claim 18, wherein the carrier vehicle comprises a tether management system, wherein the underwater vehicle and the carrier vehicle are connected to each other by a connecting cable.

25. The underwater vehicle system as claimed in claim 24, wherein the carrier vehicle has equipment for communication and/or positioning.

26. The underwater vehicle system as claimed in claim 25, wherein the equipment for communication and/or positioning is satellite-based communication and/or positioning.

27. An underwater vehicle for cleaning, inspection and/or monitoring of underwater structures A, the underwater vehicle comprising:

at least one working equipment for cleaning, inspection and/or monitoring of the underwater structures A, several interconnected modules which can be oriented relative to each other, wherein the several interconnected modules are arranged one behind the other, wherein the underwater vehicle can be transitioned from an elongated movement configuration into an annular working configuration and back, wherein the underwater vehicle functions in the annular working configuration both while surrounding an underwater structure and while not surrounding an underwater structure, wherein the underwater vehicle functions autonomously or semi-autonomously;

wherein the underwater vehicle is transitionable into at least two different working configurations, wherein in each of the working configurations a different side of the module is oriented towards a space surrounded by the underwater vehicle in the working configuration;

wherein foldable spacers are arranged on at least two modules;

wherein in the annular working configuration the interconnected modules autonomously surround the underwater structure when present to define an operational enclosure configuration;

wherein the interconnected modules are operable to maintain the annular working configuration in a fixed position during operation or to be guided along a length of the underwater structure; and wherein the transition from the elongated movement configuration to the annular working configuration is configured to establish the operational enclosure configuration for performing at least one function relative to the underwater structure.

* * * * *